US009767805B2

(12) United States Patent
Dai et al.

(10) Patent No.: US 9,767,805 B2
(45) Date of Patent: Sep. 19, 2017

(54) VOICE RECOGNITION METHOD, VOICE CONTROLLING METHOD, INFORMATION PROCESSING METHOD, AND ELECTRONIC APPARATUS

(71) Applicants: Lenovo (Beijing) Limited, Beijing (CN); Beijing Lenovo Software Ltd., Beijing (CN)

(72) Inventors: Haisheng Dai, Beijing (CN); Qianying Wang, Beijing (CN); Shi Chen, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 0 days.

(21) Appl. No.: 15/210,163

(22) Filed: Jul. 14, 2016

(65) Prior Publication Data

US 2016/0322053 A1    Nov. 3, 2016

Related U.S. Application Data

(63) Continuation of application No. 14/457,320, filed on Aug. 12, 2014, now Pat. No. 9,443,522.

(30) Foreign Application Priority Data

Nov. 18, 2013 (CN) .......................... 2013 1 0576866
Nov. 27, 2013 (CN) .......................... 2013 1 0618085
Feb. 20, 2014 (CN) .......................... 2014 1 0058898

(51) Int. Cl.
*G10L 17/06* (2013.01)
*G10L 17/22* (2013.01)
(Continued)

(52) U.S. Cl.
CPC .............. *G10L 17/06* (2013.01); *G10L 17/02* (2013.01); *G10L 17/04* (2013.01); *G10L 17/22* (2013.01);
(Continued)

(58) Field of Classification Search
USPC ...... 704/1–10, 231–239, 243, 251, 252, 257, 704/270.1
See application file for complete search history.

(56) References Cited

U.S. PATENT DOCUMENTS 5,091,947 A * 2/1992 Ariyoshi ................. G10L 15/32
379/355.06
2001/0003173 A1 * 6/2001 Lim ........................ G10L 15/20
704/239

(Continued)

FOREIGN PATENT DOCUMENTS

CN          1729511 A      2/2006
CN       102510426 A       6/2012

(Continued)

OTHER PUBLICATIONS

"U.S. Appl. No. 14/457,320, Advisory Action dated May 4, 2016", 4 pgs.

(Continued)

*Primary Examiner* — Marcellus Augustin
(74) *Attorney, Agent, or Firm* — Schwegman Lundberg & Woessner, P.A.

(57) ABSTRACT

The present disclosure provides a voice recognition method for use in an electronic apparatus comprising a voice input module. The method comprises: receiving voice data by the voice input module; performing a first pattern voice recognition on the received voice data, including identifying whether the voice data comprises a first voice recognition information; performing a second pattern voice recognition
(Continued)

on the voice data if the voice data comprises the first voice recognition information; and performing or refusing an operation corresponding to the first voice recognition information according to a result of the second pattern voice recognition. The present disclosure also provides a voice controlling method, an information processing method, and an electronic apparatus.

4 Claims, 6 Drawing Sheets

(51) Int. Cl.
    *G10L 17/02*     (2013.01)
    *G10L 17/04*     (2013.01)
    *G10L 15/22*     (2006.01)

(52) U.S. Cl.
    CPC .. *G10L 2015/221* (2013.01); *G10L 2015/223* (2013.01)

(56) References Cited

U.S. PATENT DOCUMENTS

| | | | |
|---|---|---|---|
| 2004/0122666 | A1 | 6/2004 | Ahlenius |
| 2004/0220798 | A1 | 11/2004 | Chi et al. |
| 2005/0268107 | A1 | 12/2005 | Harris et al. |
| 2005/0269107 | A1 | 12/2005 | Cook et al. |
| 2007/0239449 | A1 | 10/2007 | Luan et al. |
| 2011/0093266 | A1* | 4/2011 | Tham ............... G10L 17/04 704/246 |
| 2015/0142438 | A1 | 5/2015 | Dai et al. |
| 2015/0245154 | A1* | 8/2015 | Dadu ............... G06F 3/167 381/56 |

FOREIGN PATENT DOCUMENTS

| | | |
|---|---|---|
| CN | 102682771 A | 9/2012 |
| CN | 202510426 U | 10/2012 |
| CN | 102801721 A | 11/2012 |
| CN | 102842306 A | 12/2012 |
| CN | 102842308 A | 12/2012 |
| CN | 102930869 A | 2/2013 |
| CN | 102945669 A | 2/2013 |
| CN | 202841290 U | 3/2013 |
| CN | 103051781 A | 4/2013 |

OTHER PUBLICATIONS

"U.S. Appl. No. 14/457,320, Final Office Action dated Feb. 18, 2016", 13 pgs.
"U.S. Appl. No. 14/457,320, Non Final Office Action dated Oct. 1, 2015", 25 pgs.
"U.S. Appl. No. 14/457,320, Notice of Allowance dated May 31, 2016", 9 pgs.
"U.S. Appl. No. 14/457,320, Preliminary Amendment filed Aug. 12, 2014", 3 pgs.
"U.S. Appl. No. 14/457,320, Response filed Apr. 18, 2016 to Final Office Action dated Feb. 18, 2016", 12 pgs.
"U.S. Appl. No. 14/457,320, Response filed May 18, 2016 to Advisory Action dated May 4, 2016", 9 pgs.
"U.S. Appl. No. 14/457,320, Response filed Dec. 1, 2015 to Non Final Office Action dated Oct. 1, 2015", 15 pgs.
"Chinese Application No. 201310576866.2, Office Action dated May 18, 2016", w/ English Translation, (May 18, 2016), 18 pgs.
"Chinese Application No. 201310576866.2, Office Action dated Oct. 15, 2016", w/ English Translation, (Oct. 15, 2016), 18 pgs.
"Chinese Application No. 201310576866.2, Rejection Decision dated Sep. 9, 2016", (Sep. 9, 2016), 8 pgs.
"Chinese Application No. 201310618085.5, Office Action dated Jun. 7, 2016", w/ English Translation, (Jun. 7, 2016), 10 pgs.
"Chinese Application No. 201310618085.5, Office Action dated Oct. 10, 2015", w/ English Translation, (Oct. 10, 2015), 12 pgs.
"Chinese Application No. 201310618085.5; Office Action dated Nov. 16, 2016", w/ English Translation, (Nov. 16, 2016), 13 pgs.
"Chinese Application No. 201410058898.8, Office Action dated Mar. 8, 2016", w/ English Translation, (Mar. 8, 2016), 31 pgs.
"Chinese Application No. 201410058898.8, Office Action dated Dec. 5, 2016", w/ English Translation, (Dec. 5, 2016), 31 pgs.
"Chinese Application No. 201410058898.8, Office Action dated Apr. 6, 2017", (Apr. 6, 2017), 12 pgs.

\* cited by examiner

VOICE RECOGNITION METHOD, VOICE CONTROLLING METHOD, INFORMATION PROCESSING METHOD, AND ELECTRONIC APPARATUS

CLAIM FOR PRIORITY

This application is a continuation of and claims the benefit of priority of U.S. application Ser. No. 14/457,320, filed Aug. 12, 2014, which claims the benefit of priority of Chinese Patent Application Serial No. 201310576866.2, filed on Nov. 18, 2013, and Chinese Patent Application Serial No. 201310618085.5, filed on Nov. 27, 2013 and Chinese Patent Application Serial No. 201410058898.8, filed on Feb. 20, 2014, which applications are incorporated herein by reference in their entirety.

TECHNICAL FIELD

The present disclosure relates to voice recognition technology, and particularly to a voice recognition method, a voice controlling method, an information processing method, and an electronic apparatus.

BACKGROUND

With the rapid development and popularization of electronic apparatus, higher requirements are placed on intelligence degree thereof.

Currently, the voice recognition technology provides a quick way to control the electronic apparatus in a user-machine voice interaction manner. A user can wake up the electronic apparatus by a preset wake-up phrase using a specific voice wake-up application and perform further operations such as dialing or webpage browsing according to voice prompt instructions.

Voiceprint recognition is a voice recognition technology for human voice. Voiceprint maps of any two people are different due to differences between their vocal organs. As a result, the voiceprint can be used as a biological characteristic for characterizing individual differences. In other words, different individuals can be characterized by establishing corresponding voiceprint characteristic models, which can then be used to recognize the different individuals.

People can also control operation status of applications installed on the electronic apparatus by the voice recognition technology. For example, the electronic apparatus may derive, when receiving a voice information "Launch Taobao," an instruction and an application name therefrom and launch the Taobao application by executing the instruction.

SUMMARY

An aspect of the present disclosure provides a voice recognition method for use in an electronic apparatus comprising a voice input module, the method comprising:
  receiving voice data by the voice input module;
  performing a first pattern voice recognition on the received voice data, including identifying whether the voice data comprises a first voice recognition information;
  performing a second pattern voice recognition on the voice data if the voice data comprises the first voice recognition information; and
  performing or refusing an operation corresponding to the first voice recognition information according to a result of the second pattern voice recognition.

Optionally, the second pattern voice recognition may comprise preset-command-related voiceprint authentication; and the performing or refusing the operation corresponding to the first voice recognition information according to the result of the second pattern voice recognition may comprise:
  performing the operation corresponding to the first voice recognition information if a result of the preset-command-related voiceprint authentication is SUCCESS; and
  refusing the operation corresponding to the first voice recognition information if the result of the preset-command-related voiceprint authentication is FAILURE.

Optionally, in case where a second voice recognition information other than the first voice recognition information is identified in the voice data, the method may further comprise, prior to performing the operation corresponding to the first voice recognition information:
  performing a third pattern voice recognition on the second voice recognition information; and
  performing or refusing the operation corresponding to the first voice recognition information and an operation corresponding to the second voice recognition information according to a result of the third pattern voice recognition.

Optionally, the third pattern voice recognition may comprise preset-command-unrelated voiceprint authentication; and the performing or refusing the operation corresponding to the first voice recognition information and the operation corresponding to the second voice recognition information according to the result of the third pattern voice recognition may comprise:
  performing the operation corresponding to the first voice recognition information and the operation corresponding to the second voice recognition information if a result of the preset-command-unrelated voiceprint authentication is SUCCESS; and
  refusing the operation corresponding to the first voice recognition information and the operation corresponding to the second voice recognition information if the result of the preset-command-unrelated voiceprint authentication is FAILURE.

Optionally, the method may further comprises training a model to be used in the preset-command-unrelated voiceprint authentication using voice data of a specific scene to optimize the model.

Optionally, the method may further comprise setting or modifying, according to a first instruction, a set of the first voice recognition information or a correspondence between the first voice recognition information and the operation corresponding to the first voice recognition information.

Another aspect of the present disclosure provides a voice recognition electronic apparatus, comprising:
  a voice input module configured for receiving voice data;
  a first recognition module configured for performing a first pattern voice recognition on the received voice data, including identifying whether the voice data comprises a first voice recognition information;
  a second recognition module configured for performing a second pattern voice recognition on the voice data if the first recognition module identifies the first voice recognition information in the voice data; and
  a response module configured for performing or refusing an operation corresponding to the first voice recognition information according to a result of the second pattern voice recognition.

Optionally, the second pattern voice recognition may comprise preset-command-related voiceprint authentication; and the performing or refusing the operation corresponding to the first voice recognition information according to the result of the second pattern voice recognition may comprise:

performing the operation corresponding to the first voice recognition information if a result of the preset-command-related voiceprint authentication is SUCCESS; and refusing the operation corresponding to the first voice recognition information if the result of the preset-command-related voiceprint authentication is FAILURE.

Optionally, the electronic apparatus may further comprise a third recognition module, wherein:

the first recognition module may be further configured for identifying a second voice recognition information other than the first voice recognition information in the voice data and transmitting the second voice recognition information to the third recognition module;

the third recognition module may be configured for performing a third pattern voice recognition on the second voice recognition information; and the response module may be further configured for, prior to performing the operation corresponding to the first voice recognition information:

receiving a result of the third pattern voice recognition from the third recognition module; and performing or refusing the operation corresponding to the first voice recognition information and an operation corresponding to the second voice recognition information according to the result of the third pattern voice recognition.

Optionally, the third pattern voice recognition may comprise preset-command-unrelated voiceprint authentication; and the performing or refusing the operation corresponding to the first voice recognition information and the operation corresponding to the second voice recognition information according to the result of the third pattern voice recognition may comprise:

performing the operation corresponding to the first voice recognition information and the operation corresponding to the second voice recognition information if a result of the preset-command-unrelated voiceprint authentication is SUCCESS; and refusing the operation corresponding to the first voice recognition information and the operation corresponding to the second voice recognition information if the result of the preset-command-unrelated voiceprint authentication is FAILURE.

Optionally, the electronic apparatus may further comprise a training module configured for training a model to be used in the preset-command-unrelated voiceprint authentication using voice data of a specific scene to optimize the model.

Optionally, the electronic apparatus may further comprise a setting module configured for setting or modifying, according to a first instruction, a set of the first voice recognition information or a correspondence between the first voice recognition information and the operation corresponding to the first voice recognition information.

Another aspect of the present disclosure provides a voice controlling method for use in an electronic apparatus comprising a voice input module, the method comprising:

receiving a voice signal by the voice input module;

matching the voice signal with one or more preset instructions, each of the one or more preset instructions comprising corresponding user-defined voice data; and performing, if the voice signal matches one of the one or more preset instructions, an operation corresponding to the matched preset instruction.

Optionally, the method may further comprise:

inputting the user-defined voice data;

verifying the input user-defined voice data and storing the verified user-defined voice data in a first storage module as the preset instruction corresponding to a first operation;

transmitting the preset instruction corresponding to the first operation to a predetermined apparatus after the preset instruction corresponding to the first operation is received by the first storage module;

checking whether a model that corresponds to the preset instruction corresponding to the first operation is stored in the predetermined apparatus;

retrieving and storing the model if the model is stored in the predetermined apparatus; and checking whether the model is stored in the electronic apparatus if the model is not stored in the predetermined apparatus and establishing and storing the model if the model is not stored in the electronic apparatus.

Optionally, the method may further comprise: verifying performance of the model corresponding to the matched preset instruction using audio data containing the voice signal and the matched preset instruction.

Optionally, the method may further comprise, prior to performing the operation corresponding to the matched preset instruction:

performing a first pattern voice recognition on the voice signal; and performing or refusing the operation corresponding to the matched preset instruction according to a result of the first pattern voice recognition.

Optionally, the first pattern voice recognition may comprise performing preset-command-related voiceprint authentication on the voice signal; and the performing or refusing the operation corresponding to the matched preset instruction according to the result of the first pattern voice recognition comprises:

performing the operation corresponding to the matched preset instruction if a result of the preset-command-related voiceprint authentication is SUCCESS; and refusing the operation corresponding to the matched preset instruction if the result of the preset-command-related voiceprint authentication is FAILURE.

Optionally, the method may further comprise, prior to performing the operation corresponding to the matched preset instruction:

performing a second pattern voice recognition on a voice recognition information other than the matched preset instruction; and performing or refusing the operation corresponding to the matched preset instruction and an operation corresponding to the voice recognition information according to a result of the second pattern voice recognition.

Optionally, the second pattern voice recognition may comprise preset-command-unrelated voiceprint authentication; and the performing or refusing the operation corresponding to the matched preset instruction and the operation corresponding to the voice recognition information according to the result of the second pattern voice recognition may comprise:

performing the operation corresponding to the matched preset instruction and the operation corresponding to the voice recognition information if a result of the preset-command-unrelated voiceprint authentication is SUCCESS; and refusing the operation corresponding to the matched preset instruction and the operation corresponding to the voice recognition information if the result of the preset-command-unrelated voiceprint authentication is FAILURE.

Optionally, the method may further comprise: training a model to be used in the preset-command-unrelated voiceprint authentication using voice signal of a specific scene to optimize the model.

Optionally, the method may further comprise: setting or modifying, according to a first instruction, a set of the preset instructions or a correspondence between each preset instruction and its corresponding operation.

Optionally, each of the one or more preset instructions may further comprise corresponding user-defined text data; and matching the voice signal with the one or more preset instructions comprises:

comparing audio data containing the voice signal with the user-defined voice data in a first preset instruction and determining that a first determination result is MATCH if a similarity degree therebetween exceeds a first threshold;

comparing text data obtained by converting the voice signal with the user-defined text data in the first preset instruction and determining that a second determination result is MATCH if a similarity degree therebetween exceeds a second threshold; and determining that the voice signal matches the first preset instruction if both the first determination result and the second determination result are MATCH.

Another aspect of the present disclosure provides an electronic apparatus, comprising:

a voice input module configured for receiving a voice signal;

a first module configured for matching the voice signal with one or more preset instructions, each of the one or more preset instructions comprising corresponding user-defined voice data; and a second module configured for performing, if the voice signal matches one of the one or more preset instructions, an operation corresponding to the matched preset instruction.

Optionally, the electronic device may further comprise:
a first storage module; and
a third module configured for receiving input of the user-defined voice data, verifying the input user-defined voice data and storing the verified user-defined voice data in the first storage module as the preset instruction corresponding to a first operation;

the first storage module may be configured for:
after receiving the preset instruction corresponding to the first operation, transmitting the preset instruction corresponding to the first operation to a predetermined apparatus;
checking whether a model that corresponds to the preset instruction corresponding to the first operation is stored in the predetermined apparatus;
retrieving and storing the model if the model is stored in the predetermined apparatus; and
checking whether the model is stored in the electronic apparatus if the model is not stored in the predetermined apparatus and establishing and storing the model if the model is not stored in the electronic apparatus.

Optionally, the electronic apparatus may further comprise: a fourth module configured for verifying performance of the model corresponding to the matched preset instruction using audio data containing the voice signal and the matched preset instruction.

Optionally, the second module may be further configured for, prior to performing the operation corresponding to the matched preset instruction:

performing a first pattern voice recognition on the voice signal; and performing or refusing the operation corresponding to the matched preset instruction according to a result of the first pattern voice recognition.

Optionally, the first pattern voice recognition by the second module may comprise performing preset-command-related voiceprint authentication on the voice signal; and the performing or refusing the operation corresponding to the matched preset instruction according to the result of the first pattern voice recognition by the second module may comprise:

performing the operation corresponding to the matched preset instruction if a result of the preset-command-related voiceprint authentication is SUCCESS; and refusing the operation corresponding to the matched preset instruction if the result of the preset-command-related voiceprint authentication is FAILURE.

Optionally, the second module may be further configure for, prior to performing the operation corresponding to the matched preset instruction:

performing a second pattern voice recognition on a voice recognition information other than the matched preset instruction; and performing or refusing the operation corresponding to the matched preset instruction and an operation corresponding to the voice recognition information according to a result of the second pattern voice recognition.

Optionally, the second pattern voice recognition by the second module may comprise preset-command-unrelated voiceprint authentication; and the performing or refusing the operation corresponding to the matched preset instruction and the operation corresponding to the voice recognition information according to the result of the second pattern voice recognition by the second module may comprise:

performing the operation corresponding to the matched preset instruction and the operation corresponding to the voice recognition information if a result of the preset-command-unrelated voiceprint authentication is SUCCESS; and refusing the operation corresponding to the matched preset instruction and the operation corresponding to the voice recognition information if the result of the preset-command-unrelated voiceprint authentication is FAILURE.

Optionally, the electronic apparatus may further comprise: a fifth module configured for training a model to be used in the preset-command-unrelated voiceprint authentication using voice signal of a specific scene to optimize the model.

Optionally, the first storage module may be further configured for setting or modifying, according to a first instruction, a set of the preset instructions or a correspondence between each preset instruction and its corresponding operation.

Optionally, each of the one or more preset instructions may further comprise corresponding user-defined text data; and matching the voice signal with the one or more preset instructions by the first module may comprise:

comparing audio data containing the voice signal with the user-defined voice data in a first preset instruction and determining that a first determination result is MATCH if a similarity degree therebetween exceeds a first threshold;

comparing text data obtained by converting the voice signal with the user-defined text data in the first preset instruction and determining that a second determination result is MATCH if a similarity degree therebetween exceeds a second threshold; and determining that the voice signal matches the first preset instruction if both the first determination result and the second determination result are MATCH.

Another aspect of the present disclosure provides an information processing method for use in an electronic apparatus, the method comprising:

detecting a voice information;

obtaining a first content information and a first voiceprint information from the voice information;

controlling the electronic apparatus to run a first application corresponding to the first content information; and controlling the electronic apparatus to run a second application other than the first application if the first voiceprint information is a preset voiceprint information.

Optionally, the obtaining the first content information and the first voiceprint information from the voice information may comprise:

obtaining a first reliability degree of the first content information and a second reliability degree of the first voiceprint information, wherein the first reliability degree corresponds to reliability of the first content information and the second reliability degree corresponds to reliability of the first voiceprint information;

selecting a first reliability degree threshold from at least two preset reliability degree thresholds;

determining whether the first reliability degree is larger than the first reliability degree threshold to obtain a first determination result and/or determining whether the second reliability degree is larger than the first reliability degree threshold to obtain a second determination result; and setting the first content information as a final content information if the first determination result is YES and setting the first voiceprint information as a final voiceprint information if the second determination result is YES, wherein the first determination result being YES indicates that the first content information is accurate and the second determination result being YES indicates that the first voiceprint information is accurate.

Optionally, the at least two reliability degree thresholds are preset according to at least one of: contents identifiable by a second obtaining unit of the electronic apparatus and a network condition of the electronic apparatus.

Optionally, the method may further comprise, after the obtaining the first determination result and/or the second determination result:

transmitting the voice information to a second voice recognition device connected with the electronic apparatus if the first determination result and/or the second determination result is NO, the second voice recognition device being configured for identifying the voice information to obtain a second content information if the first determination result is NO and to obtain a second voiceprint information if the second determination result is NO; and receiving the obtained second content information and/or second voiceprint information from the second voice recognition device and setting the obtained second content information and/or second voiceprint information as the final content information or voiceprint information, respectively.

Optionally, the method may further comprise, after the detecting the voice information:

transmitting the voice information to a second voice recognition device connected with the electronic apparatus, the second voice recognition device being configured for identifying the voice information to obtain a second content information and/or a second voiceprint information; and receiving the second content information from the second voice recognition device if the first determination result is NO and receiving the second voiceprint information from the second voice recognition device if the second determination result is NO within a preset time period, if the first determination result and/or the second determination result are NO.

Optionally, the method may further comprise, after the controlling the electronic apparatus to run the first application corresponding to the first content information and controlling the electronic apparatus to run the second application other than the first application if the first voiceprint information is the preset voiceprint information:

obtaining a first authentication information corresponding to the first application by running the second application, the first authentication information being stored in the electronic apparatus and used for authentication of the first application.

Optionally, the obtaining the first authentication information corresponding to the first application by running the second application may comprise:

generating a dynamic password through running the second application by the electronic apparatus;

detecting a second voice information produced when a user is reading the dynamic password;

determining whether the second voice information satisfies a preset condition to obtain a third determination result; and obtaining the first authentication information if the third determination result is YES.

Optionally, the determining whether the second voice information satisfies the preset condition to obtain the third determination result may comprise:

obtaining a third content information and a third voiceprint information from the second voice information;

determining whether the third content information is the dynamic password to obtain a fourth determination result;

determining whether the third voice information is the preset voiceprint information if the fourth determination result is YES; and determining the third determination result to be YES if the fourth determination result is YES and the third voiceprint information is the preset voiceprint information and otherwise determining the third determination result to be NO.

Another aspect of the present disclosure provides an electronic apparatus, comprising:

a first obtaining unit configured for detecting a voice information;

a second obtain unit configured for obtaining a first content information and a first voiceprint information from the voice information; and a first processing unit configured for controlling the electronic apparatus to run a first application corresponding to the first content information and controlling the electronic apparatus to run a second application other than the first application if the first voiceprint information is a preset voiceprint information.

Optionally, the second obtaining unit may comprise:

a second obtain sub-unit configured for obtaining a first reliability degree of the first content information and a second reliability degree of the first voiceprint information, wherein the first reliability degree corresponds to reliability of the first content information and the second reliability degree corresponds to reliability of the first voiceprint information;

a second selecting sub-unit configured for selecting a first reliability degree threshold from at least two preset reliability degree thresholds;

a second determination sub-unit configured for determining whether the first reliability degree is larger than the first reliability degree threshold to obtain a first determination result and/or determining whether the second reliability degree is larger than the first reliability degree threshold to obtain a second determination result; and a second processing sub-unit configured for setting the first content information as a final content information if the first determination result is YES and setting the first voiceprint information as a final voiceprint information if the second determination result is YES, wherein the first determination result being YES indicates that the first content information is accurate and the second determination result being YES indicates that the first voiceprint information is accurate.

Optionally, the at least two reliability degree thresholds may be preset according to at least one of: contents identifiable by the second obtaining unit of the electronic apparatus and a network condition of the electronic apparatus.

Optionally, the second processing sub-unit may be further configured for, after the obtaining the first determination result and/or the second determination result:

transmitting the voice information to a second voice recognition device connected with the electronic apparatus if the first determination result and/or the second determination result is NO, the second voice recognition device being configured for identifying the voice information to obtain a second content information if the first determination result is NO and to obtain a second voiceprint information if the second determination result is NO; and receiving the obtained second content information and/or second voiceprint information from the second voice recognition device and setting the obtained second content information and/or second voiceprint information as the final content information or voiceprint information, respectively.

Optionally, the second processing sub-unit may be further configured for, after the detecting the voice information:

transmitting the voice information to a second voice recognition device connected with the electronic apparatus, the second voice recognition device being configured for identifying the voice information to obtain a second content information and/or a second voiceprint information; and receiving the second content information from the second voice recognition device if the first determination result is NO and receiving the second voiceprint information from the second voice recognition device if the second determination result is NO within a preset time period, if the first determination result and/or the second determination result are NO.

Optionally, the electronic apparatus may further comprise a second processing unit configured for: after the controlling the electronic apparatus to run the first application corresponding to the first content information and controlling the electronic apparatus to run the second application other than the first application if the first voiceprint information is the preset voiceprint information:

obtaining a first authentication information corresponding to the first application by running the second application, the first authentication information being stored in the electronic apparatus and used for authentication of the first application.

Optionally, the second processing sub-unit may comprise:

a first generating sub-unit configured for generating a dynamic password through running the second application by the electronic apparatus;

a third obtaining sub-unit configured for detecting a second voice information produced when a user is reading the dynamic password;

a third determining sub-unit configured for determining whether the second voice information satisfies a preset condition to obtain a third determination result; and a third processing sub-unit configured for obtaining the first authentication information if the third determination result is YES.

Optionally, the third determining sub-unit may comprise:

a third obtaining module configured for obtaining a third content information and a third voiceprint information from the second voice information;

a third determining module configured for determining whether the third content information is the dynamic password to obtain a fourth determination result;

a third processing module configured for:
  determining whether the third voice information is the preset voiceprint information if the fourth determination result is YES; and
  determining the third determination result to be YES if the fourth determination result is YES and the third voiceprint information is the preset voiceprint information and otherwise determining the third determination result to be NO.

Other features and advantages of the present disclosure will be illustrated in the following description or be understood by implementing the present disclosure. Objects and advantages of the present disclosure can be implemented and achieved by embodiments described in the specification, claims, and accompanying drawings.

BRIEF DESCRIPTION OF THE DRAWINGS

The drawings in connection with embodiments described in the specification are provided to facilitate understanding of the present disclosure and should not be interpreted as limitation thereof.

DETAILED DESCRIPTION

Figure 1:
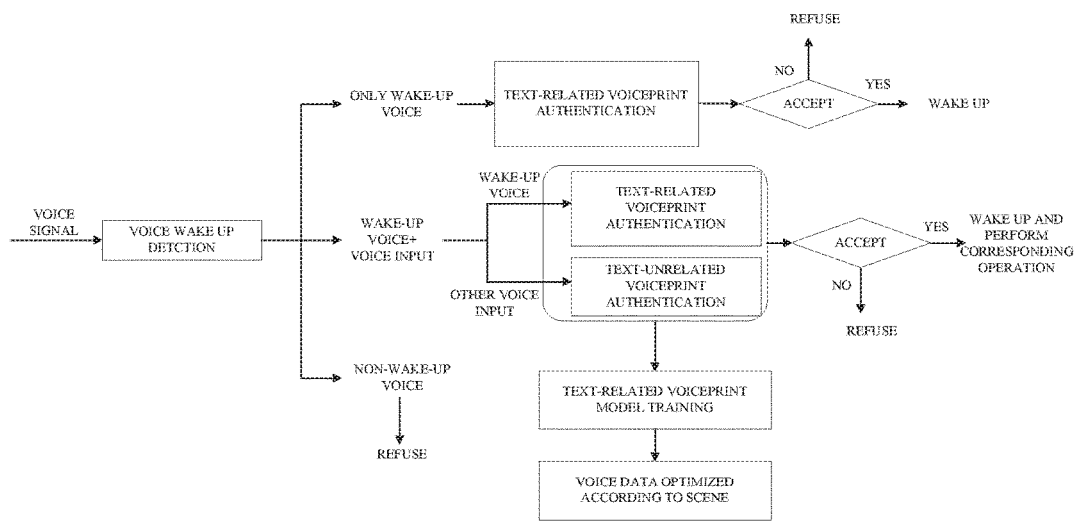
FIG. 1 schematically shows a flow chart of a voice recognition method in Embodiment 6 of the present disclosure.

Objects, features and advantages of the present disclosure will become more apparent from the following detailed descriptions of specific embodiments thereof with reference to accompanying drawings. The embodiments and features thereof can be combined in various ways unless conflict exists or otherwise indicated.

Steps shown in the flow charts can be implemented in a computer system. The order for executing the steps can be different from what is shown in the drawings.

Embodiment 1

This embodiment relates to a voice recognition method, which is applicable in a smart mobile terminal, a tablet computer, and any other electronic apparatus comprising a voice input module.

The method comprises:

S11: receiving voice data by the voice input module;

S12: performing a first pattern voice recognition on the received voice data, including identifying whether the voice data comprises a first voice recognition information;

S13: performing a second pattern voice recognition on the voice data if the voice data comprises the first voice recognition information; and S14: performing or refusing an operation corresponding to the first voice recognition information according to a result of the second pattern voice recognition.

In this embodiment, when the voice input contains the first voice recognition information, two types of voice recognition can be performed on the same voice input. The operation corresponding to the first voice recognition information can be performed or refused automatically according to the recognition result. This process only needs one voice input, thereby simplifying the voice recognition process.

In this embodiment, there may be one or more first voice recognition information. That is, there may be a set of the first voice recognition information. Each first voice recognition information may correspond to a different operation. Alternatively, a number of first voice recognition information may correspond to a same operation. If the entirety or a part of the voice data matches at least one first voice recognition information A in the set of the first voice recognition information, it can be determined that the voice data comprises the first voice recognition information A. If a part of the voice data matches the first voice recognition information A while another part of the first voice recognition information matches a first voice recognition information B, one of the first voice recognition information A and B can be selected as the recognized first voice recognition information according to a preset strategy. An operation corresponding to the recognized first voice recognition information is performed according to the result of the second pattern voice recognition.

In this embodiment, the second pattern voice recognition can be designed as desired. For example, the second pattern voice recognition can be used to determine whether the first voice recognition information has characteristic satisfying a preset condition. In this case, the second pattern voice recognition may be voiceprint recognition. Alternatively, the second pattern voice recognition may be used to determine whether the first voice recognition information contains predetermined information, such as a voice input including content and order that match a predetermined password.

In this embodiment, when there are more than two results of the second pattern voice recognition, performance or refusal of the operation corresponding to the first voice recognition information can be designated separately for each result.

Embodiment 2

This embodiment comprises every feature from Embodiment 1. In this embodiment, the second pattern voice recognition may comprise preset-command-related voiceprint authentication; and the performing or refusing the operation corresponding to the first voice recognition information according to the result of the second pattern voice recognition may comprise:

performing the operation corresponding to the first voice recognition information if a result of the preset-command-related voiceprint authentication is SUCCESS; and refusing the operation corresponding to the first voice recognition information if the result of the preset-command-related voiceprint authentication is FAILURE.

In this embodiment, the preset-command-related voiceprint authentication may use a voiceprint model trained by a set of preset commands. The set of preset commands may comprise the first voice recognition information. The preset-command-related voiceprint authentication can determine whether the voiceprint of the first voice recognition information matches the voiceprint of a predetermined user authorized for operation. There may be one or more authorized users, which can be set or modified as desired.

In this embodiment, the voiceprint authentication is performed and the operation corresponding to the first voice recognition information is performed or refused according to the determination result. In this way, the first voice recognition information can be authenticated so that the operation corresponding to the first voice recognition information will not be performed by a person other than the authorized user through voice input.

In this embodiment, if the operation corresponding to the first voice recognition information is wake up, the electronic apparatus will refuse to wake up, rather than perform the voiceprint authentication after wake up, if the voiceprint of the user does not match a preset voiceprint in the electronic apparatus. This can further improve security of the electronic apparatus.

Embodiment 3

This embodiment comprises every feature from Embodiment 2. In this embodiment, in case where a second voice recognition information other than the first voice recognition information is identified in the voice data, the method may further comprise, prior to performing the operation corresponding to the first voice recognition information:

performing a third pattern voice recognition on the second voice recognition information; and performing or refusing the operation corresponding to the first voice recognition information and an operation corresponding to the second voice recognition information according to a result of the third pattern voice recognition.

In this embodiment, in case where the result of the preset-command-related voiceprint authentication is SUCCESS, if the voice data comprises a second voice recognition information other than the first voice recognition information, the third pattern voice recognition is performed on the second voice recognition information prior to performing the operation corresponding to the first voice recognition information to determine whether the operation corresponding to the first voice recognition information and the operation corresponding to the second voice recognition information should be performed.

In this way, the accuracy and reliability of recognition can be improved. If the first voice recognition information is "wake up," erroneous determination may be made because the phase is short. If the user input additional voice data other than "wake up," voiceprint authentication can be performed on both the phrase "wake up" and the additional voice data. The accuracy and reliability of determination can thus be improved.

In another embodiment, preset-command-unrelated voiceprint authentication can be performed if it is determined that the voice information comprises voice input other than the first voice recognition information. The operation corresponding to the first voice recognition information and the operation corresponding to the second voice recognition information are performed or refused according to the determination result of the preset-command-unrelated voiceprint authentication. The preset-command-related voiceprint authentication is not performed.

Embodiment 4

This embodiment comprises every feature from Embodiment 3. In this embodiment, the third pattern voice recognition may comprise preset-command-unrelated voiceprint authentication; and the performing or refusing the operation corresponding to the first voice recognition information and the operation corresponding to the second voice recognition information according to the result of the third pattern voice recognition may comprise:

performing the operation corresponding to the first voice recognition information and the operation corresponding to the second voice recognition information if a result of the preset-command-unrelated voiceprint authentication is SUCCESS; and refusing the operation corresponding to the first voice recognition information and the operation corresponding to the second voice recognition information if the result of the preset-command-unrelated voiceprint authentication is FAILURE.

In this embodiment, the preset-command-unrelated voiceprint authentication may use a voiceprint model that is trained by voice input other than the preset commands. The first voice recognition information and the second voice recognition information can be authenticated using the same voiceprint model. Both the preset-command-related voiceprint authentication and the preset-command-unrelated voiceprint authentication are used in this embodiment to improve the reliability of recognition.

In this embodiment, the operation corresponding to the first voice recognition information is performed if both the voiceprint authentication for the first voice recognition information and the voiceprint authentication for the second voice recognition information are successful. If either voiceprint authentication is failed, the operation corresponding to the first voice recognition information will be refused. If the second voice recognition information has a corresponding operation, the operation is performed if the voiceprint authentication for the second voice recognition information is successful. If the second voice recognition information is voice data having no corresponding operation in the electronic apparatus, i.e., the electronic apparatus cannot identify an operation corresponding to the second voice recognition information, determination will be made only as to performance or refusal of the operation corresponding to the first voice recognition information, no matter what the result of the preset-command-unrelated voiceprint authentication is. In an implementation of this embodiment, the model used in the preset-command-unrelated voiceprint authentication may be trained by voice data of a specific scene to optimize the model.

The voice data of the specific scene may comprise frequently-used phrases and sentences in a scene where a voice engine is to be used. This training can improve match degree of the preset-command-unrelated voiceprint authentication and thereby improve the performance thereof.

Embodiment 5

This embodiment comprises every feature from any one of Embodiments 1-4. In this embodiment, the method may further comprise setting or modifying, according to a first instruction, a set of the first voice recognition information or a correspondence between the first voice recognition information and the operation corresponding to the first voice recognition information.

In this embodiment, the first voice recognition information and its corresponding operation can be set as desired, thereby improving flexibility and controllability of the voice recognition and avoiding erroneous operation when there exist a plurality of electronic apparatus or applications.

For example, if the user has two or more electronic apparatus, the first voice recognition information for a first electronic apparatus may be set to "wake up XX" and the first voice recognition information for a second electronic apparatus may be set to "wake up YY." The "XX" and "YY" are names of the first and second electronic apparatus, respectively. The first electronic apparatus performs wake-up operation if it recognizes "wake up XX" in the voice input and the preset-command-related voiceprint authentication is successful. The first electronic apparatus determines that the voice input does not comprise the first voice recognition information if it recognize "wake up YY" in the voice input.

For another example, in case where the user has two QQ accounts on the electronic apparatus, the first voice recognition information may be set to comprise "launch QQ1" and "launch QQ2." If the voice input comprises either one of "launch QQ1" and "launch QQ2," the electronic apparatus will determine that the voice input comprises the first voice recognition information. However, the two sentences may correspond to different operations. After the preset-command-related voiceprint authentication, the QQ1 account will be launched for the sentence "launch QQ1" and the QQ2 account will be launched for the sentence "launch QQ2."

The operation corresponding to the second voice recognition information can be set or modified using a setting module.

Embodiment 6

This embodiment relates to a voice recognition method, which is applicable in a smart mobile terminal, a tablet computer, and any other electronic apparatus comprising a voice input module.

In this embodiment, the first voice recognition information is a wake-up voice.

As shown in FIG. 1, the method of this embodiment comprises:

In step S21, a voice wake-up application in the electronic apparatus recognizes voice data input by a user, comprising recognizing whether the voice data comprises wake-up voice and whether the voice data comprises only the wake-up voice.

In step S22, if the voice data comprises only the wake-up voice, the voice data is determined to be a separate wake-up voice and preset-command-related voiceprint authentication is performed. Voice wake-up operation is performed if the preset-command-related voiceprint authentication is successful. Otherwise the voice wake-up operation is not performed.

In step S23, the voiceprint authentication is performed as follows if the voice data comprises both the wake-up voice and an additional voice input (e.g., second voice recognition information) other than the wake-up voice:

Example 1

The preset-command-related voiceprint authentication is performed on the wake-up voice and the voice wake-up operation is performed if the voiceprint authentication is successful. Otherwise the voice wake-up operation is refused.

Example 2

The preset-command-unrelated voiceprint authentication is performed on the additional voice input other than the wake-up voice. The voice wake-up operation and an operation corresponding to the additional voice input are performed if the voiceprint authentication is successful. Otherwise the voice wake-up operation and the operation corresponding to the additional voice input are refused.

Example 3

The preset-command-related voiceprint authentication is performed on the wake-up voice. The preset-command-unrelated voiceprint authentication is performed on the additional voice input other than the wake-up voice. The voice wake-up operation and an operation corresponding to the additional voice input are performed if both voiceprint authentications are successful. Otherwise the voice wake-up operation and an operation corresponding to the additional voice input are refused.

In step S24, the voice wake-up operation is refused if the voice data does not comprise the wake-up voice, i.e., the voice data is non-wake-up voice.

The steps S21 and S22 may be performed in parallel. The voice wake-up operation is performed if the voice data comprises the wake-up voice and meanwhile the voiceprint authentication is successful. Otherwise the method continues to detecting the voice data input by the user.

Alternatively, the steps S21 and S23 may be performed in parallel. The voiceprint authentication is the preset-command-unrelated voiceprint authentication. Alternatively, the voice recognition and the preset-command-unrelated voiceprint authentication are performed in parallel immediately after the wake-up voice is recognized, thereby improving response speed.

According to this embodiment, the voiceprint authentication is performed on the wake-up voice when the user is using the voice wake-up operation. In this way, the voiceprint authentication and the voice wake-up operation are combined into a single process, thereby simplifying user interaction and improving efficiency. The voiceprint authentication is performed on the information of the voice wake-up phase and thus is preset-command-related voiceprint authentication, which has a better performance than the preset-command-unrelated voiceprint authentication.

Additionally, the preset-command-unrelated voiceprint authentication can be performed when the user is inputting the voice wake-up phrase or the voice wake-up phrase plus the voice input, so that only the command from a particular user is executed. In this way, redundant interaction due to a separate voiceprint authentication step can be avoided, thereby improving interaction efficiency.

Embodiment 7

Figure 2:
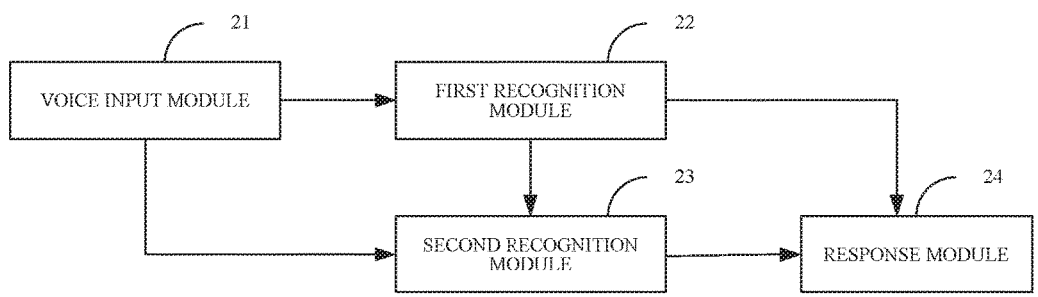
FIG. 2 schematically shows a block diagram of a voice recognition electronic apparatus in Embodiment 7 of the present disclosure.

This embodiment relates to a voice recognition electronic apparatus. As shown in FIG. 2, the electronic apparatus comprises:

a voice input module 21 configured for receiving voice data;

a first recognition module 22 configured for performing a first pattern voice recognition on the received voice data, including identifying whether the voice data comprises a first voice recognition information;

a second recognition module 23 configured for performing a second pattern voice recognition on the voice data if the first recognition module identifies the first voice recognition information in the voice data; and a response module 24 configured for performing or refusing an operation corresponding to the first voice recognition information according to a result of the second pattern voice recognition.

In this embodiment, when the voice input contains the first voice recognition information, two types of voice recognition can be performed on the same voice input. The operation corresponding to the first voice recognition information can be performed or refused automatically according to the recognition result. This process only needs one voice input, thereby simplifying the voice recognition process.

In this embodiment, there may be one or more first voice recognition information. That is, there may be a set of the first voice recognition information. Each first voice recognition information may correspond to a different operation. Alternatively, a number of first voice recognition information may correspond to a same operation. If the entirety or a part of the voice data matches at least one first voice recognition information A in the set of the first voice recognition information, it can be determined that the voice data comprises the first voice recognition information A. If a part of the voice data matches the first voice recognition information A while another part of the first voice recognition information matches a first voice recognition information B, one of the first voice recognition information A and B can be selected as the recognized first voice recognition information according to a preset strategy. An operation corresponding to the recognized first voice recognition information is performed according to the result of the second pattern voice recognition.

In this embodiment, the second pattern voice recognition can be designed as desired. For example, the second pattern voice recognition can be used to determine whether the first voice recognition information has characteristic satisfying a preset condition. In this case, the second pattern voice recognition may be voiceprint recognition. Alternatively, the second pattern voice recognition may be used to determine whether the first voice recognition information contains predetermined information, such as a voice input including content and order that match a predetermined password.

In this embodiment, when there are more than two results of the second pattern voice recognition, performance or refusal of the operation corresponding to the first voice recognition information can be designated separately for each result.

Embodiment 8

This embodiment comprises every feature from Embodiment 7. In this embodiment, the second pattern voice recognition may comprise preset-command-related voiceprint authentication; and the performing or refusing the operation corresponding to the first voice recognition information according to the result of the second pattern voice recognition may comprise:

performing the operation corresponding to the first voice recognition information if a result of the preset-command-related voiceprint authentication is SUCCESS; and refusing the operation corresponding to the first voice recognition information if the result of the preset-command-related voiceprint authentication is FAILURE.

In this embodiment, the preset-command-related voiceprint authentication may use a voiceprint model trained by a set of preset commands. The set of preset commands may comprise the first voice recognition information. The preset-command-related voiceprint authentication can determine whether the voiceprint of the first voice recognition information matches the voiceprint of a predetermined user authorized for operation. There may be one or more authorized users, which can be set or modified as desired.

In this embodiment, the voiceprint authentication is performed by the response module and the operation corresponding to the first voice recognition information is performed or refused according to the determination result. In this way, the first voice recognition information can be authenticated so that the operation corresponding to the first voice recognition information will not be performed by a person other than the authorized user through voice input.

In this embodiment, if the operation corresponding to the first voice recognition information is wake up, the electronic apparatus will refuse to wake up, rather than perform the voiceprint authentication after wake up, if the voiceprint of the user does not match a preset voiceprint in the electronic apparatus. This can further improve security of the electronic apparatus.

Embodiment 9

This embodiment comprises every feature from Embodiment 8. In this embodiment, the electronic apparatus may further comprise a third recognition module, wherein:

the first recognition module may be further configured for identifying a second voice recognition information other than the first voice recognition information in the voice data and transmitting the second voice recognition information to the third recognition module;

the third recognition module may be configured for performing a third pattern voice recognition on the second voice recognition information; and the response module may be further configured for, prior to performing the operation corresponding to the first voice recognition information:

receiving a result of the third pattern voice recognition from the third recognition module; and performing or refusing the operation corresponding to the first voice recognition information and an operation corresponding to the second voice recognition information according to the result of the third pattern voice recognition.

In this embodiment, in case where the result of the preset-command-related voiceprint authentication is SUCCESS, if the voice data comprises a second voice recognition information other than the first voice recognition information, the third pattern voice recognition is performed on the second voice recognition information by the response module prior to performing the operation corresponding to the first voice recognition information to determination whether the operation corresponding to the first voice recognition information and the operation corresponding to the second voice recognition information should be performed.

In this way, the accuracy and reliability of recognition can be improved. If the first voice recognition information is "wake up," erroneous determination may be made because the phase is short. If the user input additional voice data other than "wake up," voiceprint authentication can be performed on both the phrase "wake up" and the additional voice data. The accuracy and reliability of determination can thus be improved.

In another embodiment, preset-command-unrelated voiceprint authentication can be performed if it is determined that the voice information comprises voice input other than the first voice recognition information. The operation corresponding to the first voice recognition information and the operation corresponding to the second voice recognition information are performed or refused according to the determination result of the preset-command-unrelated voiceprint authentication. The preset-command-related voiceprint authentication is not performed.

Embodiment 10

This embodiment comprises every feature from Embodiment 9. In this embodiment, the third pattern voice recognition may comprise preset-command-unrelated voiceprint authentication; and the performing or refusing the operation corresponding to the first voice recognition information and the operation corresponding to the second voice recognition information according to the result of the third pattern voice recognition may comprise:

performing the operation corresponding to the first voice recognition information and the operation corresponding to the second voice recognition information if a result of the preset-command-unrelated voiceprint authentication is SUCCESS; and refusing the operation corresponding to the first voice recognition information and the operation corresponding to the second voice recognition information if the result of the preset-command-unrelated voiceprint authentication is FAILURE.

In this embodiment, the preset-command-unrelated voiceprint authentication may use a voiceprint model that is trained by voice input other than the preset commands. The first voice recognition information and the second voice recognition information can be authenticated using the same voiceprint model. Both the preset-command-related voiceprint authentication and the preset-command-unrelated voiceprint authentication are used in this embodiment to improve the reliability of recognition.

In this embodiment, the operation corresponding to the first voice recognition information is performed if both the voiceprint authentication for the first voice recognition information and the voiceprint authentication for the second voice recognition information are successful. If either voiceprint authentication is failed, the operation corresponding to the first voice recognition information will be refused. If the second voice recognition information has a corresponding operation, the operation is performed if the voiceprint authentication for the second voice recognition information is successful. If the second voice recognition information is voice data having no corresponding operation in the electronic apparatus, i.e., the electronic apparatus cannot identify an operation corresponding to the second voice recognition information, determination will be made only as to performance or refusal of the operation corresponding to the first voice recognition information, no matter what the result of the preset-command-unrelated voiceprint authentication is.

Embodiment 11

This embodiment comprises every feature of embodiment 10. In this embodiment, the electronic apparatus may further comprise a training module configured for training a model to be used in the preset-command-unrelated voiceprint authentication using voice data of a specific scene to optimize the model.

The voice data of the specific scene may comprise frequently-used phrases and sentences in a scene where a voice engine is to be used. This training can improve match degree of the preset-command-unrelated voiceprint authentication and thereby improve the performance thereof.

Embodiment 12

This embodiment comprises every feature of any one of embodiments 7-11. In this embodiment, the electronic apparatus may further comprise a setting module configured for setting or modifying, according to a first instruction, a set of the first voice recognition information or a correspondence between the first voice recognition information and the operation corresponding to the first voice recognition information.

In this embodiment, the first voice recognition information and its corresponding operation can be set as desired, thereby improving flexibility and controllability of the voice recognition and avoiding erroneous operation when there exist a plurality of electronic apparatus or applications.

For example, if the user has two or more electronic apparatus, the first voice recognition information for a first electronic apparatus may be set to "wake up XX" and the first voice recognition information for a second electronic apparatus may be set to "wake up YY." The "XX" and "YY" are names of the first and second electronic apparatus, respectively. The first electronic apparatus performs wake-up operation if it recognizes "wake up XX" in the voice input and the preset-command-related voiceprint authentication is successful. The first electronic apparatus determines that the voice input does not comprise the first voice recognition information if it recognize "wake up YY" in the voice input.

For another example, in case where the user has two QQ accounts on the electronic apparatus, the first voice recognition information may be set to comprise "launch QQ1" and "launch QQ2." If the voice input comprises either one of "launch QQ1" and "launch QQ2," the electronic apparatus will determine that the voice input comprises the first voice recognition information. However, the two sentences may correspond to different operations. After the preset-command-related voiceprint authentication, the QQ1 account will be launched for the sentence "launch QQ1" and the QQ2 account will be launched for the sentence "launch QQ2."

The operation corresponding to the second voice recognition information can be set or modified using a setting module.

In at least one foregoing embodiment, the first pattern voice recognition is performed after the first voice recognition information is recognized in the input voice data. The operation corresponding to the first voice recognition information is performed according to the result of the second pattern voice recognition. For example, when the user is performing voice wake up, the voiceprint of the user is authenticated using the wake-up voice. The voiceprint authentication and the voice wake up are combined as a single process, thereby simplifying interaction of the user and improving efficiency. Also, the preset-command-related voiceprint authentication is used in the voiceprint authentication, thereby achieving better performance than the preset-command-unrelated voiceprint authentication.

In at least one foregoing embodiment, the preset-command-related voiceprint authentication is performed on the first voice recognition information when the user is inputting the wake-up voice or the wake-up voice plus the voice input operation instruction via the first voice recognition information. In this way, only the command of a specific user is performed, thereby avoiding redundant interaction due to a separate voiceprint authentication and improving interaction efficiency.

In at least one foregoing embodiment, when the user inputs the additional voice input (the second voice recognition information) other than the first voice recognition information, the voiceprint authentication is performed on both the first voice recognition information and the second voice recognition information by preset-command-related voiceprint authentication and preset-command-unrelated voiceprint authentication, respectively. The performance of authentication is improved because the input voice has a longer length.

In at least one foregoing embodiment, the model to be used in the preset-command-unrelated voiceprint authentication can be trained by frequently-used sentences in the scene where the voice engine is used to optimize the model. This can improve the match degree of the preset-command-unrelated voiceprint authentication and thereby the performance of the preset-command-unrelated voiceprint authentication.

Those skilled in the art will understand that it is possible that at least one embodiment of the present disclosure may have none of the foregoing advantages.

Embodiment 13

Figure 3:
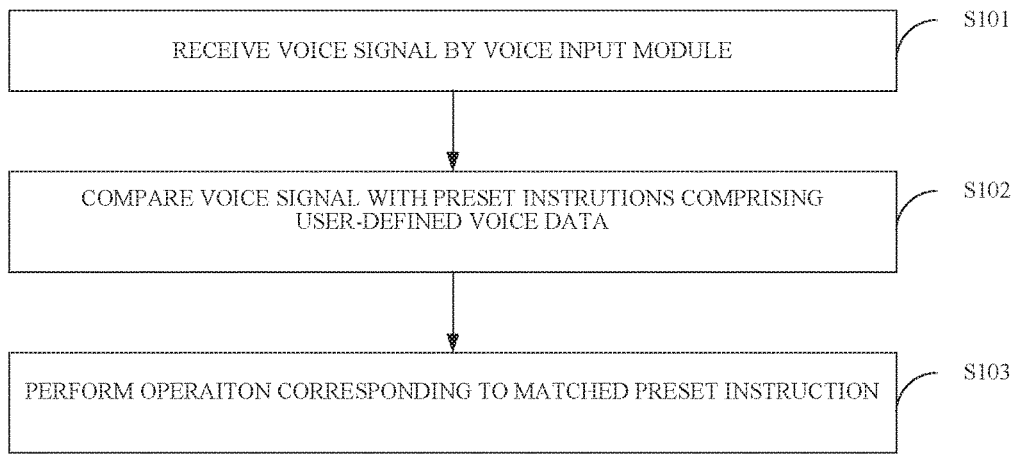
FIG. 3 schematically shows a flow chart of a voice controlling method in Embodiment 13 of the present disclosure.

This embodiment relates to a voice controlling method for use in an electronic apparatus comprising a voice input module. As shown in FIG. 3, the method comprises:

S101: receiving a voice signal by the voice input module;

S102: matching the voice signal with one or more preset instructions, each of the one or more preset instructions comprising corresponding user-defined voice data; and S103: performing, if the voice signal matches one of the one or more preset instructions, an operation corresponding to the matched preset instruction.

In this embodiment, the electronic apparatus may comprise any one of mobile phone, tablet computer, e-book, notebook, or e-dictionary. The electronic apparatus comprise the voice input module for receiving the voice signal sent by the user.

In this embodiment, if the voice signal received by the electronic apparatus matches the user-defined voice data in the preset instruction pre-stored in the electronic apparatus by the user, the electronic apparatus executes the corresponding operation. For example, the user-defined voice data is "I want to chat." The corresponding operation is to launch a first instant communication application and log in a first account. When the electronic apparatus receives a voice signal matching "I want to chat," the first instant communication application is launched and the first account is logged in. For another example, user-defined voice data "start working" corresponds to an operation of waking up the electronic apparatus. Therefore, the electronic apparatus switches to a normal working state from a sleep state.

In this embodiment, the voice control of the electronic apparatus by the user is not limited to the instructions and operations predefined by the manufacturer of the electronic apparatus. Instead, various user-defined voice data can be set as the preset instructions for specific operations, thereby improving flexibility of the voice control and satisfying personalized requirements of the users. For example, different users may define different voice data to wake up their electronic apparatus. In this way, each user can wake up his own electronic apparatus without affecting the electronic apparatus of others when there exist a plurality of apparatus of a plurality of users. For another example, when the user as a plurality of electronic apparatus, different user-defined voice data can be defined for the electronic apparatus, which can then be controlled by inputting different voice signals. For example, "start working" corresponds to an instruction of waking up the first electronic apparatus but is not stored as the preset instruction in other electronic apparatus. Thus, when the user input the voice signal "start working," only the first electronic apparatus is woken up without affecting the other electronic apparatus.

Embodiment 14

This embodiment comprises every feature of any one of embodiment 13. In this embodiment, the method may further comprise:

inputting the user-defined voice data;

verifying the input user-defined voice data and storing the verified user-defined voice data in a first storage module as the preset instruction corresponding to a first operation;

transmitting the preset instruction corresponding to the first operation to a predetermined apparatus after the preset instruction corresponding to the first operation is received by the first storage module;

checking whether a model that corresponds to the preset instruction corresponding to the first operation is stored in the predetermined apparatus;

retrieving and storing the model if the model is stored in the predetermined apparatus; and checking whether the model is stored in the electronic apparatus if the model is not stored in the predetermined apparatus and establishing and storing the model if the model is not stored in the electronic apparatus.

The foregoing steps of this embodiment can be performed before or after steps S101-S103, or can be performed in parallel thereto. It is not necessary to obtain the preset instruction comprising the user-defined voice data via the foregoing steps of this embodiment. For example, the verification can be omitted. For another example, the preset instruction can be exported from a first electronic apparatus and imported into a second electronic apparatus.

In this embodiment, optionally rather than necessarily, the input voice signal may be set as the user-defined voice data when a first preset condition, e.g., a specific application is launched on the electronic apparatus, a specific key or key combination is pressed, or a specific gesture is input, is satisfied in order to distinguish the user-defined voice data from the input voice signal. The user-defined voice data is verified and stored as the preset instruction corresponding to the first operation. The first operation may be designated on the electronic apparatus before, after, or simultaneously with inputting the user-defined voice data. The voice signal that is input when the first preset condition is not satisfied is matched with the preset instruction directly to determine whether the corresponding operation should be performed.

In an implementation of this embodiment, the verification of the input user-defined voice data may comprise but not limited to determining whether the user-defined voice data contain no less than four Chinese characters or no less than four non-Chinese words. If yes, the verification is successful. In this embodiment, the user-defined voice data is verified by a specific strategy. In this way, voice data that might affect performance or accuracy of voice recognition or performance of voice control will not be set as the preset instruction, thereby ensuring basic voice control performance. For example, when the user tries to set monosyllable characters such as "de" and "a" as the user-defined voice data, the verification will not be successful. This can prevent triggering the voice control by daily conversations of the user.

In this embodiment, the predetermined apparatus may be but not limited to a cloud server. The electronic apparatus may transmit the user-defined voice data to the server via a network. If a model corresponding to the user-defined voice data already exists on the server, the model may be stored in the electronic apparatus directly. Otherwise, the electronic apparatus is checked to determine whether the model corresponding to the user-defined voice data is stored therein. If no, the model is established and stored in the electronic apparatus or also on the server. This can avoid duplicate training and verification of the model and improve response speed. It is not necessary to re-establish the model when the user changes the electronic apparatus.

In another embodiment, it can be first determined whether the corresponding model is stored in the electronic apparatus. If no, the predetermined apparatus is checked. Alternatively, the model is searched for only in the electronic apparatus or in the predetermined apparatus.

Figure 4:
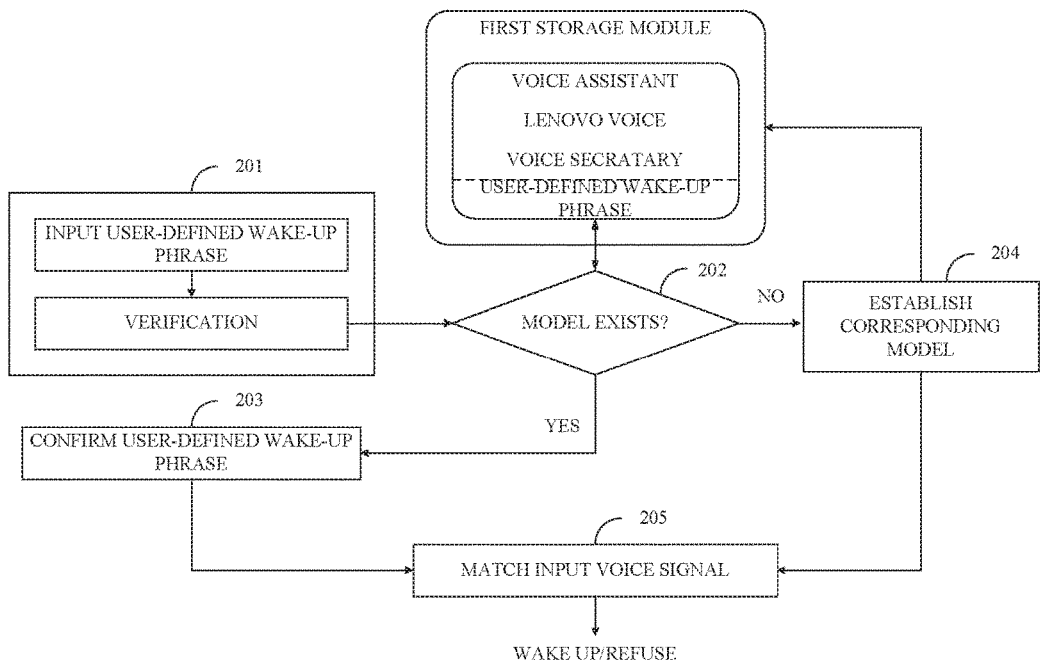
FIG. 4 schematically shows a flow chart of a voice controlling method in an example of Embodiment 14 of the present disclosure.

Next, this embodiment will be explained with reference to a specific example. In this example, the operation corresponding to the preset instruction is to wake up the electronic apparatus. The user-defined voice data included in the preset instruction is a user-defined wake-up phrase input by a user. The model is searched for only in the electronic apparatus. As shown in FIG. 4, the method comprises the following steps.

In step 201, the user inputs the user-defined wake-up phrase via an application in the electronic apparatus for setting the preset instruction using the user-defined voice data.

In particular, the user inputs the user-defined wake-up phrase. The user-defined wake-up phrase input by the user is verified by a predetermined verification strategy, e.g., the wake-up phrase should contain no less than four Chinese characters or no less than four non-Chinese words. The verified user-defined wake-up phrase and its corresponding operation (i.e., to wake up the electronic apparatus) are stored. The method then proceeds to step 202.

In step 202, it is determined whether the model corresponding to the user-defined wake-up phrase is stored in a local model library in the electronic apparatus. If yes, the method proceeds to step 203. Otherwise the method proceeds to step 204.

In step 203, the user confirms the user-defined wake-up phrase in the local model library and the method proceeds to step 205.

In step 204, the model corresponding to the user-defined wake-up phrase input by the user is established and stored in the local model library. Optionally, the model may be trained before being stored in the library.

In step 205, the user inputs a voice signal to wake up the electronic apparatus. The voice signal is first compared with the wake-up phrases pre-stored in the electronic apparatus, i.e., default voice instructions pre-stored in the electronic apparatus, such as Voice Assistant, Lenovo Voice, or Voice Secretary, etc. The wake-up operation is performed if the input voice signal matches one of the pre-stored wake-up phrases. Otherwise the input voice signal is compared with the user-defined wake-up phrase stored in the electronic apparatus. The wake-up operation is performed if the input voice signal matches one of the user-defined wake-up phrases. The wake-up operation is refused if the input voice signal matches none of the user-defined wake-up phrases and the user-defined wake-up phrases.

In this example, the input voice signal is first compared with the default voice instructions and then with the user-defined voice data if it matches none of the default voice instructions. In another example, the input voice signal may first be compared with the user-defined voice data and then with the default voice instructions if it matches none of the user-defined voice data. Alternatively, the input voice signal may be compared with the user-defined voice data and the default voice instructions simultaneously.

Embodiment 15

This embodiment comprises every feature of embodiment 14. In this embodiment, the method may further comprise: verifying performance of the model corresponding to the matched preset instruction using audio data containing the voice signal and the matched preset instruction.

In this embodiment, the performance verification may be performed by the electronic apparatus or a server. This can improve the voice wake up performance and implement functions such as optimization and recommendation of the user-defined voice data.

Figure 5:
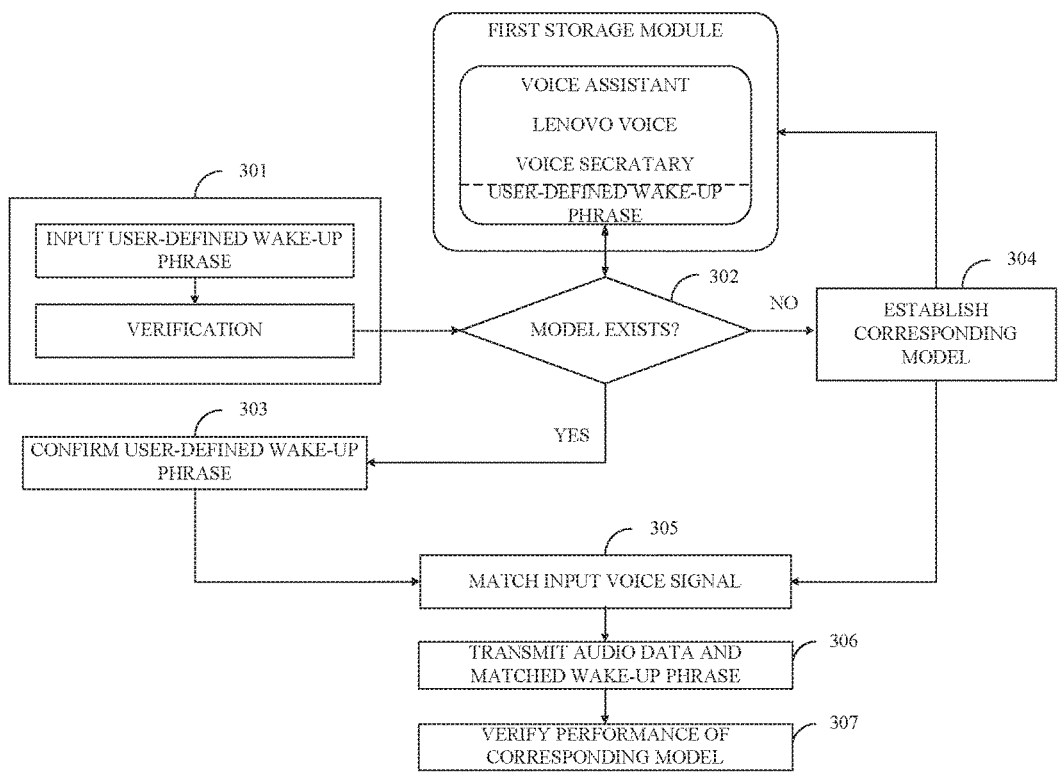
FIG. 5 schematically shows a flow chart of a voice controlling method in an example of Embodiment 15 of the present disclosure.

An example of this embodiment is shown in FIG. 5. In the method of FIG. 5, steps 301-305 are the same as steps 201-205 in embodiment 14. The method further comprises the following steps.

In step 306, the audio data containing the input voice signal and the matched wake-up phrases are transmitted to a data management module.

In step 307, the data management module transmits the audio data, the matched wake-up phrases, and basic testing data to a wake-up phrases performance verification module. The wake-up phrases performance verification module is configured for verifying performance of the model corresponding to the user-defined wake-up phrases.

In another example, the user-defined wake-up phrases may be checked, tagged, modified, or deleted.

Figure 6:
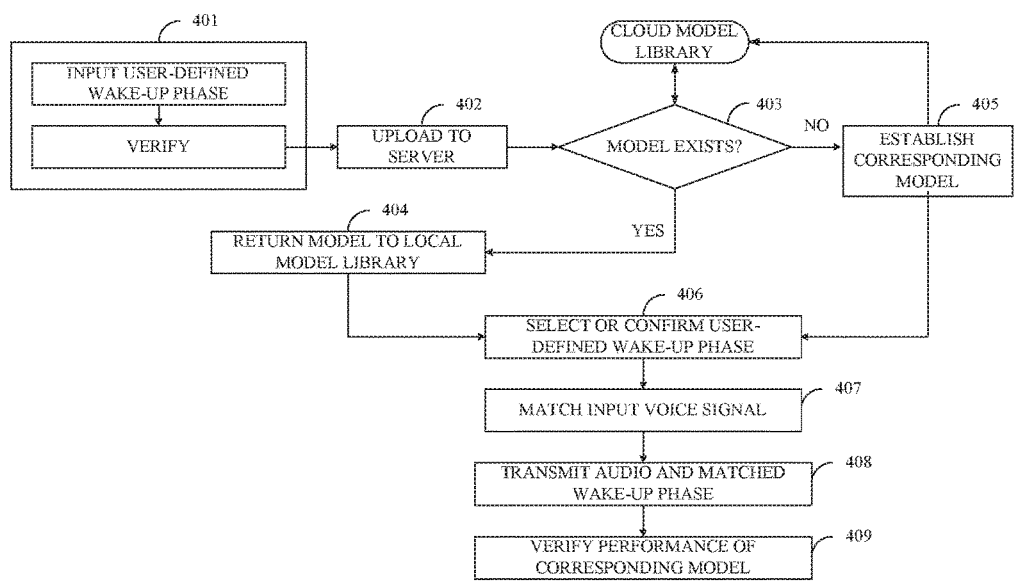
FIG. 6 schematically shows a flow chart of a voice controlling method in another example of Embodiment 15 of the present disclosure.

Another example of this embodiment is similar to the foregoing one. A difference between the two examples is that the model is searched for in a cloud server. This example is shown in FIG. 6 and comprises the following steps.

In step 401, the user inputs the user-defined wake-up phrase via an application in the electronic apparatus for setting the preset instruction using the user-defined voice data.

In particular, the user inputs the user-defined wake-up phrase. The user-defined wake-up phrase input by the user is verified by a predetermined verification strategy, e.g., the wake-up phrase should contain no less than four Chinese characters or no less than four non-Chinese words. The verified user-defined wake-up phrase and its corresponding operation (i.e., to wake up the electronic apparatus) are stored. The method then proceeds to step 402.

In step 402, the verified user-defined wake-up phrase is uploaded to the server.

In step 403, the server determines whether the model corresponding to the user-defined wake-up phrase is stored in a cloud model library. If yes, the method proceeds to step 404. Otherwise the method proceeds to step 405.

In step 404, the model corresponding to the user-defined wake-up phrase is transmitted to a local model library in the electronic apparatus and the method proceeds to step 406.

In this step, the cloud model library may recommend a wake-up phrase with a better performance to the user according to training result of model optimization and transmit the recommended wake-up phrase to the local model library in the electronic apparatus for the user to select.

In step 405, the model corresponding to the user-defined wake-up phrase is established if it does not exist in the cloud model library. The established model corresponding to the user-defined wake-up phrase may be trained and stored in the cloud model library. The method then proceeds to step 406.

Alternatively, the established model corresponding to the user-defined wake-up phase, after being trained, may be transmitted to the local model library in the electronic apparatus while being stored in the cloud model library.

In step 406, the user selects or confirms the user-defined wake-up phrase provided or recommended by the local model library.

In step 407, the user inputs a voice signal to wake up the electronic apparatus. The voice signal is first compared with the wake-up phrases pre-stored in the electronic apparatus, i.e., default voice instructions pre-stored in the electronic apparatus, such as Voice Assistant, Lenovo Voice, or Voice Secretary, etc. The wake-up operation is performed if the input voice signal matches one of the pre-stored wake-up phrases. Otherwise the input voice signal is compared with the user-defined wake-up phrase stored in the electronic apparatus. The wake-up operation is performed if the input voice signal matches one of the user-defined wake-up phrases. The wake-up operation is refused if the input voice signal matches none of the user-defined wake-up phrases and the user-defined wake-up phrases.

In step 408, the audio data containing the input voice signal and the matched preset wake-up phase are uploaded to the data management module on the server.

In step 409, the data management module on the server transmits the audio data, the matched wake-up phase, and basic testing data to the wake-up phrase performance verification module. The wake-up phrase performance verification module is configured for verifying the performance of the model corresponding to the user-defined wake-up phase.

Alternatively, the user-defined wake-up phase can be checked, tagged, modified, or deleted. In another example, the data management module and the wake-up phase performance verification module may be located completely or partly on the server or the electronic apparatus.

Embodiment 16

This embodiment comprises every feature of any one of embodiments 14 and 15. In this embodiment, the method may further comprise, prior to performing the operation corresponding to the matched preset instruction:
performing a first pattern voice recognition on the voice signal; and
performing or refusing the operation corresponding to the matched preset instruction according to a result of the first pattern voice recognition.

In this embodiment, the first pattern voice recognition can be designed as desired. For example, the first pattern voice recognition can be used to determine whether the voice signal has a characteristic satisfying a preset condition, e.g., voiceprint recognition. The first pattern voice recognition can also be used to determine whether the voice signal contains predetermined information, such as a voice input including content and order that match a predetermined password. When there are more than two results of the first pattern voice recognition, performance or refusal of the operation corresponding to the matched preset instruction can be designated separately for each result.

In this embodiment, the recognition of the voice signal can be performed with a single input of the voice signal when the voice signal matches at least one of the preset instructions. The operation corresponding to the preset instruction is performed or refused automatically according to the recognition result. The process does not need redundant operation of the user and thus simplifies the process of the voice recognition.

Embodiment 17

This embodiment comprises every feature of embodiment 16. In this embodiment, the first pattern voice recognition may comprise performing preset-command-related voiceprint authentication on the voice signal; and
the performing or refusing the operation corresponding to the matched preset instruction according to the result of the first pattern voice recognition comprises:
performing the operation corresponding to the matched preset instruction if a result of the preset-command-related voiceprint authentication is SUCCESS; and
refusing the operation corresponding to the matched preset instruction if the result of the preset-command-related voiceprint authentication is FAILURE.

In this embodiment, the preset-command-related voiceprint authentication may use a voiceprint model trained by a set of preset commands. The set of preset commands may comprise the user-defined voice data in the preset instruction. The preset-command-related voiceprint authentication can determine whether the voiceprint of the user-defined voice data matches the voiceprint of a predetermined user authorized for operation. There may be one or more authorized users, which can be set or modified as desired.

In this embodiment, the voiceprint authentication is performed and the operation corresponding to the preset instruction is performed or refused according to the determination result. In this way, the voice signal can be authenticated so that the operation corresponding to the preset instruction will not be performed by a person other than the authorized user through voice input.

In this embodiment, if the operation corresponding to the preset instruction is wake up, the electronic apparatus will refuse to wake up, rather than perform the voiceprint authentication after wake up, if the voiceprint of the user does not match a preset voiceprint in the electronic apparatus. This can further improve security of the electronic apparatus.

Embodiment 18

This embodiment comprises every feature of embodiment 17. In this embodiment, the method may further comprise, prior to performing the operation corresponding to the matched preset instruction:
performing a second pattern voice recognition on a voice recognition information other than the matched preset instruction; and
performing or refusing the operation corresponding to the matched preset instruction and an operation corresponding to the voice recognition information according to a result of the second pattern voice recognition.

In this embodiment, in case where the voice data comprises additional voice recognition information other than the preset instruction, the second pattern voice recognition is performed on the additional voice recognition information prior to performing the operation corresponding to the preset instruction to determine whether the operation corresponding to the preset instruction and the operation corresponding to the additional voice recognition information should be performed.

The second pattern voice recognition may be performed before or after the second pattern voice recognition. The operation corresponding to the preset instruction is performed when both recognitions are successful.

In this way, the accuracy and reliability of recognition can be improved. If the first voice recognition information is "wake up," erroneous determination may be made because the phase is short. If the user input additional voice data other than "wake up," voiceprint authentication can be performed on both the phrase "wake up" and the additional voice data. The accuracy and reliability of determination can thus be improved.

In another embodiment, the second pattern voice recognition can be performed if it is determined that the voice information comprises the additional voice recognition information other than the preset instruction. The operation corresponding to the preset instruction and the operation corresponding to the additional voice recognition information are performed or refused according to the result of the second pattern voice recognition. The preset-command-related voiceprint authentication is not performed.

Embodiment 19

This embodiment comprises every feature of embodiment 18. In this embodiment, the second pattern voice recognition may comprise preset-command-unrelated voiceprint authentication; and
the performing or refusing the operation corresponding to the matched preset instruction and the operation corresponding to the voice recognition information according to the result of the second pattern voice recognition may comprise:

performing the operation corresponding to the matched preset instruction and the operation corresponding to the voice recognition information if a result of the preset-command-unrelated voiceprint authentication is SUCCESS; and refusing the operation corresponding to the matched preset instruction and the operation corresponding to the voice recognition information if the result of the preset-command-unrelated voiceprint authentication is FAILURE.

In this embodiment, the preset-command-unrelated voiceprint authentication may use a voiceprint model that is trained by voice input other than the preset commands. The input voice signal can be authenticated using the same voiceprint model. Both the preset-command-related voiceprint authentication and the preset-command-unrelated voiceprint authentication are used in this embodiment to improve the reliability of recognition.

In this embodiment, the operation corresponding to the preset instruction is performed if both the first pattern voice recognition and the second pattern voice recognition are successful. If either one of the first pattern voice recognition or the second pattern voice recognition is failed, the operation corresponding to the preset instruction will be refused. If the additional voice recognition information has a corresponding operation, the operation is performed if the voiceprint authentication for the additional voice recognition information is successful. If the additional voice recognition information is voice data having no corresponding operation in the electronic apparatus, i.e., the electronic apparatus cannot identify an operation corresponding to the additional voice recognition information, determination will be made only as to performance or refusal of the operation corresponding to the preset instruction, no matter what the result of the preset-command-unrelated voiceprint authentication is.

In an implementation of this embodiment, the model used in the preset-command-unrelated voiceprint authentication may be trained by voice data of a specific scene to optimize the model.

The voice data of the specific scene may comprise frequently-used phrases and sentences in a scene where a voice engine is to be used. This training can improve match degree of the preset-command-unrelated voiceprint authentication and thereby improve the performance thereof.

Embodiment 20

This embodiment comprises every feature of any one of embodiments 13-19. In this embodiment, the method may further comprise: setting or modifying, according to a first instruction, a set of the preset instructions or a correspondence between each preset instruction and its corresponding operation.

In this embodiment, the preset instruction and its corresponding operation can be set or modified as desired, thereby improving flexibility and controllability. For another example, in case where the user has two QQ accounts on the electronic apparatus, the first voice recognition information may be set to comprise "launch QQ1" and "launch QQ2." If the voice input comprises either one of "launch QQ1" and "launch QQ2," the electronic apparatus will determine that the voice input comprises the first voice recognition information. However, the two sentences may correspond to different operations. After the preset-command-related voiceprint authentication, the QQ1 account will be launched for the sentence "launch QQ1" and the QQ2 account will be launched for the sentence "launch QQ2."

The operation corresponding to the additional voice recognition information can be set or modified using a setting module.

Embodiment 21

This embodiment comprises every feature of any one of embodiments 13-20. In this embodiment, each of the one or more preset instructions may further comprise corresponding user-defined text data; and matching the voice signal with the one or more preset instructions comprises:

comparing audio data containing the voice signal with the user-defined voice data in a first preset instruction and determining that a first determination result is MATCH if a similarity degree therebetween exceeds a first threshold;

comparing text data obtained by converting the voice signal with the user-defined text data in the first preset instruction and determining that a second determination result is MATCH if a similarity degree therebetween exceeds a second threshold; and determining that the voice signal matches the first preset instruction if both the first determination result and the second determination result are MATCH.

In this embodiment, the input voice signal is subjected to double-matching, thereby improving the reliability of matching result. The input voice signal should contain a characteristic sufficiently similar to that of the user-defined voice data in the preset instruction. Meanwhile, the text converted from the input voice signal should be sufficiently similar to that from the same preset instruction. This can reduce erroneous determination effectively.

Embodiment 22

This embodiment relates to an electronic apparatus, comprising:

a voice input module configured for receiving a voice signal;

a first module configured for matching the voice signal with one or more preset instructions, each of the one or more preset instructions comprising corresponding user-defined voice data; and a second module configured for performing, if the voice signal matches one of the one or more preset instructions, an operation corresponding to the matched preset instruction.

In this embodiment, the electronic apparatus may comprise any one of mobile phone, tablet computer, e-book, notebook, or e-dictionary. The electronic apparatus comprise the voice input module for receiving the voice signal sent by the user.

In this embodiment, the electronic apparatus performs the operation corresponding to the voice signal received by the electronic apparatus if the voice signal matches the user-defined voice data stored in the electronic apparatus by the user as the predetermined instruction.

According to this embodiment, the voice control of the electronic apparatus by the user is not limited to the instructions and operations predetermined by the electronic apparatus manufacturer. Instead, various user-defined voice data can be set as the preset instructions for specific operations as desired, thereby improving the flexibility of voice control and satisfying personalization requirements of the user.

Embodiment 23

This embodiment comprises every feature of embodiment 22. In this embodiment, the electronic device may further comprise:
a first storage module; and
a third module configured for receiving input of the user-defined voice data, verifying the input user-defined voice data and storing the verified user-defined voice data in the first storage module as the preset instruction corresponding to a first operation;
the first storage module may be configured for:
after receiving the preset instruction corresponding to the first operation, transmitting the preset instruction corresponding to the first operation to a predetermined apparatus;
checking whether a model that corresponds to the preset instruction corresponding to the first operation is stored in the predetermined apparatus;
retrieving and storing the model if the model is stored in the predetermined apparatus; and
checking whether the model is stored in the electronic apparatus if the model is not stored in the predetermined apparatus and establishing and storing the model if the model is not stored in the electronic apparatus.

The foregoing operations of the third module in this embodiment can be performed before or after the operations of the first and second modules, or can be performed in parallel thereto. It is not necessary to obtain the preset instruction comprising the user-defined voice data via the foregoing steps of this embodiment. For example, the verification can be omitted. For another example, the preset instruction can be exported from a first electronic apparatus and imported into a second electronic apparatus.

In this embodiment, optionally rather than necessarily, the input voice signal may be set by the third module as the user-defined voice data when a first preset condition is satisfied in order to distinguish the user-defined voice data from the input voice signal. The user-defined voice data is verified and stored as the preset instruction corresponding to the first operation. The first operation may be designated on the electronic apparatus before, after, or simultaneously with inputting the user-defined voice data. The voice signal that is input when the first preset condition is not satisfied is matched with the preset instruction by the first module directly to determine whether the corresponding operation should be performed.

In an implementation of this embodiment, the verification of the input user-defined voice data by the third module may comprise but not limited to determining whether the user-defined voice data contain no less than four Chinese characters or no less than four non-Chinese words. If yes, the verification is successful. In this embodiment, the user-defined voice data is verified by a specific strategy. In this way, voice data that might affect performance or accuracy of voice recognition or performance of voice control will not be set as the preset instruction, thereby ensuring basic voice control performance.

In this embodiment, the predetermined apparatus may be but not limited to a cloud server. The electronic apparatus may transmit the user-defined voice data to the server via a network. If a model corresponding to the user-defined voice data already exists on the server, the model may be stored in the electronic apparatus directly. Otherwise, the electronic apparatus is checked to determine whether the model corresponding to the user-defined voice data is stored therein. If no, the model is established and stored in the electronic apparatus or also on the server. This can avoid duplicate training and verification of the model and improve response speed. It is not necessary to re-establish the model when the user changes the electronic apparatus.

In another embodiment, it can be first determined whether the corresponding model is stored in the electronic apparatus. If no, the predetermined apparatus is checked. Alternatively, the model is searched for only in the electronic apparatus or in the predetermined apparatus.

Embodiment 24

This embodiment comprises every feature of embodiment 22. In this embodiment, the electronic apparatus may further comprise: a fourth module configured for verifying performance of the model corresponding to the matched preset instruction using audio data containing the voice signal and the matched preset instruction.

In this embodiment, the performance verification may be performed by the electronic apparatus or a server. This can improve the voice wake up performance and implement functions such as optimization and recommendation of the user-defined voice data.

Embodiment 25

This embodiment comprises every feature of any one of embodiments 22-24. In this embodiment, the second module may be further configured for, prior to performing the operation corresponding to the matched preset instruction:
performing a first pattern voice recognition on the voice signal; and
performing or refusing the operation corresponding to the matched preset instruction according to a result of the first pattern voice recognition.

In this embodiment, the first pattern voice recognition can be designed as desired. For example, the first pattern voice recognition can be used to determine whether the voice signal has a characteristic satisfying a preset condition, e.g., voiceprint recognition. The first pattern voice recognition can also be used to determine whether the voice signal contains predetermined information, such as a voice input including content and order that match a predetermined password. When there are more than two results of the first pattern voice recognition, performance or refusal of the operation corresponding to the matched preset instruction can be designated separately for each result.

In this embodiment, the recognition of the voice signal can be performed with a single input of the voice signal when the voice signal matches at least one of the preset instructions. The operation corresponding to the preset instruction is performed or refused automatically according to the recognition result. The process does not need redundant operation of the user and thus simplifies the process of the voice recognition.

Embodiment 26

This embodiment comprises every feature of embodiment 25. In this embodiment, the first pattern voice recognition by the second module may comprise performing preset-command-related voiceprint authentication on the voice signal; and the performing or refusing the operation corresponding to the matched preset instruction according to the result of the first pattern voice recognition by the second module may comprise:
  performing the operation corresponding to the matched preset instruction if a result of the preset-command-related voiceprint authentication is SUCCESS; and
  refusing the operation corresponding to the matched preset instruction if the result of the preset-command-related voiceprint authentication is FAILURE.

In this embodiment, the preset-command-related voiceprint authentication may use a voiceprint model trained by a set of preset commands. The set of preset commands may comprise the user-defined voice data in the preset instruction. The preset-command-related voiceprint authentication can determine whether the voiceprint of the user-defined voice data matches the voiceprint of a predetermined user authorized for operation. There may be one or more authorized users, which can be set or modified as desired.

In this embodiment, the voiceprint authentication is performed and the operation corresponding to the preset instruction is performed or refused according to the determination result. In this way, the voice signal can be authenticated so that the operation corresponding to the preset instruction will not be performed by a person other than the authorized user through voice input.

In this embodiment, if the operation corresponding to the preset instruction is wake up, the electronic apparatus will refuse to wake up, rather than perform the voiceprint authentication after wake up, if the voiceprint of the user does not match a preset voiceprint in the electronic apparatus. This can further improve security of the electronic apparatus.

Embodiment 27

This embodiment comprises every feature of embodiment 26. In this embodiment, the second module may be further configure for, prior to performing the operation corresponding to the matched preset instruction:
  performing a second pattern voice recognition on a voice recognition information other than the matched preset instruction; and
  performing or refusing the operation corresponding to the matched preset instruction and an operation corresponding to the voice recognition information according to a result of the second pattern voice recognition.

In this embodiment, in case where the voice data comprises additional voice recognition information other than the preset instruction, the second pattern voice recognition is performed on the additional voice recognition information prior to performing the operation corresponding to the preset instruction to determine whether the operation corresponding to the preset instruction and the operation corresponding to the additional voice recognition information should be performed.

The second pattern voice recognition may be performed before or after the second pattern voice recognition. The operation corresponding to the preset instruction is performed when both recognitions are successful.

In this way, the accuracy and reliability of recognition can be improved. The performance of recognition can be improved because the voice signal is longer.

In another embodiment, the second pattern voice recognition can be performed if it is determined that the voice information comprises the additional voice recognition information other than the preset instruction. The operation corresponding to the preset instruction and the operation corresponding to the additional voice recognition information are performed or refused according to the result of the second pattern voice recognition. The preset-command-related voiceprint authentication is not performed.

Embodiment 28

This embodiment comprises every feature of embodiment 27. In this embodiment, the second pattern voice recognition by the second module may comprise preset-command-unrelated voiceprint authentication; and
  the performing or refusing the operation corresponding to the matched preset instruction and the operation corresponding to the voice recognition information according to the result of the second pattern voice recognition by the second module may comprise:
    performing the operation corresponding to the matched preset instruction and the operation corresponding to the voice recognition information if a result of the preset-command-unrelated voiceprint authentication is SUCCESS; and
    refusing the operation corresponding to the matched preset instruction and the operation corresponding to the voice recognition information if the result of the preset-command-unrelated voiceprint authentication is FAILURE.

In this embodiment, the preset-command-unrelated voiceprint authentication may use a voiceprint model that is trained by voice input other than the preset commands. The input voice signal can be authenticated using the same voiceprint model. Both the preset-command-related voiceprint authentication and the preset-command-unrelated voiceprint authentication are used in this embodiment to improve the reliability of recognition.

In this embodiment, the operation corresponding to the preset instruction is performed if both the first pattern voice recognition and the second pattern voice recognition are successful. If either one of the first pattern voice recognition or the second pattern voice recognition is failed, the operation corresponding to the preset instruction will be refused. If the additional voice recognition information has a corresponding operation, the operation is performed if the voiceprint authentication for the additional voice recognition information is successful. If the additional voice recognition information is voice data having no corresponding operation in the electronic apparatus, i.e., the electronic apparatus cannot identify an operation corresponding to the additional voice recognition information, determination will be made only as to performance or refusal of the operation corresponding to the preset instruction, no matter what the result of the preset-command-unrelated voiceprint authentication is.

Embodiment 29

This embodiment comprises every feature of embodiment 28. In this embodiment, the electronic apparatus may further comprise: a fifth module configured for training a model to be used in the preset-command-unrelated voiceprint authentication using voice signal of a specific scene to optimize the model.

The voice data of the specific scene may comprise frequently-used phrases and sentences in a scene where a voice engine is to be used. This training can improve match degree of the preset-command-unrelated voiceprint authentication and thereby improve the performance thereof.

Embodiment 30

This embodiment comprises every feature of any one of embodiments 22-29. In this embodiment, the first storage module may be further configured for setting or modifying, according to a first instruction, a set of the preset instructions or a correspondence between each preset instruction and its corresponding operation. In this embodiment, the preset instruction and its corresponding operation can be set or modified as desired, thereby improving flexibility and controllability. The operation corresponding to the additional voice recognition information can also be set or modified as desired.

Embodiment 31

This embodiment comprises every feature of any one of embodiments 22-30. In this embodiment, each of the one or more preset instructions may further comprise corresponding user-defined text data; and matching the voice signal with the one or more preset instructions by the first module may comprise:

comparing audio data containing the voice signal with the user-defined voice data in a first preset instruction and determining that a first determination result is MATCH if a similarity degree therebetween exceeds a first threshold;

comparing text data obtained by converting the voice signal with the user-defined text data in the first preset instruction and determining that a second determination result is MATCH if a similarity degree therebetween exceeds a second threshold; and determining that the voice signal matches the first preset instruction if both the first determination result and the second determination result are MATCH.

In this embodiment, the input voice signal is subjected to double-matching, thereby improving the reliability of matching result. The input voice signal should contain a characteristic sufficiently similar to that of the user-defined voice data in the preset instruction. Meanwhile, the text converted from the input voice signal should be sufficiently similar to that from the same preset instruction. This can reduce erroneous determination effectively.

It should be noted that the devices and/or components of the system as well as steps in the methods as provided in the foregoing embodiments can be implemented on a single computing device or distributed on a network comprising a plurality of computing devices. Optionally, they can be implemented by program codes executable by the computing device(s). The program codes can be stored in a storage device for execution of the computing device(s). Alternatively, the functions thereof can be distributed into respective integrated circuits or certain functions can be integrated into one single integrated circuit module. Thus, the present disclosure is not limited to any specific combination of hardware and software.

At least one forgoing embodiment allows the user to define the voice signal corresponding to a specific operation to enable flexible voice control of the electronic apparatus and satisfy the user's personalized requirement. At least one foregoing embodiment can improve the response speed of voice recognition and avoid duplicate training by the stored model. At least one foregoing embodiment can improve the performance of voice control by the performance verification of the model and further implement functions such as optimization and recommendation of the user-defined voice data. At least one foregoing embodiment can perform voice recognition on the input voice recognition when the input voice signal matches the preset instruction to improve operation efficiency and simplify interaction process. In at least one foregoing embodiment, the voiceprint recognition is performed on the voice signal that matches the preset instruction to ensure that only an authorized user can perform voice control. In at least one foregoing embodiment, the matched preset instruction and the additional voice recognition information are both subjected to recognition to improve the reliability of recognition. In at least one foregoing embodiment, the model to be used in the preset-command-unrelated voiceprint authentication is trained and optimized using the frequently-used sentences in the scene where the voice engine is used to improve the performance of the preset-command-unrelated voiceprint authentication. In at least one foregoing embodiment, the user-defined voice data and the text data are used in recognition of the input voice signal to improve the reliability of the recognition.

Another aspect of the present disclosure provides an information processing method for use in an electronic apparatus, the method comprising:

detecting a voice information;

obtaining a first content information and a first voiceprint information from the voice information;

controlling the electronic apparatus to run a first application corresponding to the first content information; and controlling the electronic apparatus to run a second application other than the first application if the first voiceprint information is a preset voiceprint information.

According to this method, two different applications can be controlled by different characteristics of a single voice information, thereby providing an efficient way in controlling the application on the electronic apparatus by voice input.

Embodiment 32

Figure 7:
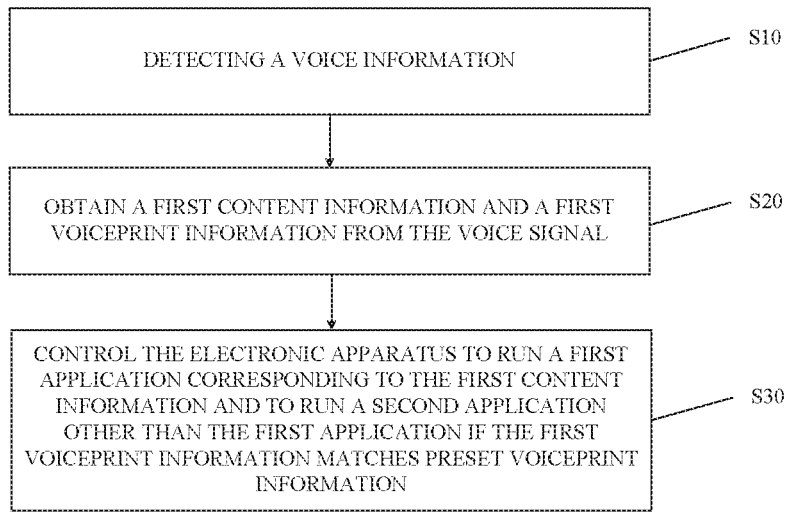
FIG. 7 schematically shows a flow chart of an information processing method in Embodiment 32 of the present disclosure.
Figure 8:
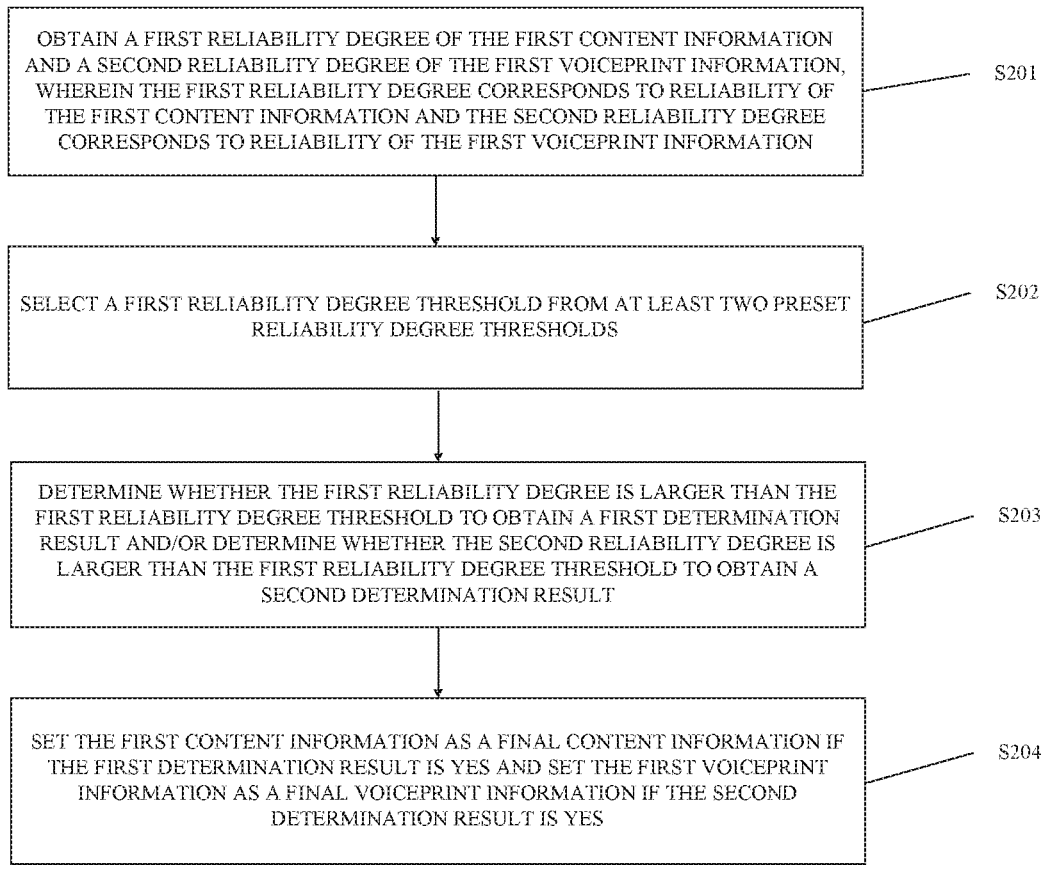
FIG. 8 schematically shows a flow chart of step S20 in the information processing method in Embodiment 32 of the present disclosure.
Figure 9:
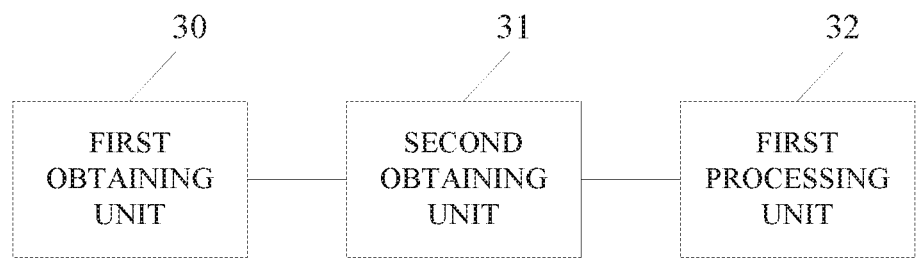
FIG. 9 schematically shows a block diagram in an electronic apparatus in Embodiment 33 of the present disclosure.

This embodiment provides an information processing method for use in an electronic apparatus. As shown in FIG. 7, the method comprises:

S10: detecting a voice information;

S20: obtaining a first content information and a first voiceprint information from the voice information;

S30: controlling the electronic apparatus to run a first application corresponding to the first content information; and controlling the electronic apparatus to run a second application other than the first application if the first voiceprint information is a preset voiceprint information.

The electronic apparatus may be a smart phone, a tablet computer, or a notebook computer. One or more applications may be run simultaneously on the electronic apparatus. The first application and the second application may be different applications. Alternatively, the first application and the second application may be different threads under a same process.

In step S10, the voice information may be detected by the following two ways, but is not limited thereto.

1. The electronic apparatus has an audio collecting unit, such as a microphone or a recorder. The voice information can be detected when the electronic apparatus turns on the microphone or the recorder.

2. In this embodiment, the detected voice information is converted into electrical signals, i.e., audio signals corresponding to the voice information, for recognition. The input voice may be uttered in various languages such as Chinese, English, or German. Alternatively, the voice may be Chinese mixed with English words. Those skilled in the art may modify this embodiment according to the way the voice is uttered or the way of detecting the voice. All such modifications fall within the scope of the present disclosure.

In this embodiment, different characteristics should be extracted from the voice information obtained by the electronic apparatus in step S10 in order to control at least two applications or threads so that the electronic apparatus can be controlled to implement different functions. Step S20 is performed after step S10 to obtain the first content information and the first voiceprint information.

In particular, after the electronic apparatus obtains the voice information, the voice information is subjected to recognition. For example, the obtained voice information is "Launch Taobao." The electronic apparatus derives a command and an application name by recognition of the voice information. For the voice information "Launch Taobao," the command is to launch an application and the corresponding application name is "Taobao."

Furthermore, in order to control a plurality of applications or a plurality of threads under a same process by a single voice information, other characteristics, e.g., sound pressure information or voiceprint information, etc., can be obtained from the voice information detected in step S10. In other implementations, the electronic apparatus can be controlled by other characteristics of the voice. All such implementations fall within the scope of the present disclosure.

In this embodiment, the voiceprint information is used to control the electronic apparatus. The voiceprint information is unique to every individual, as fingerprint information. Thus, it is very safe and reliable to control the electronic apparatus by the voiceprint information.

In particular, the first voiceprint information obtained in step S20 is compared with a preset voiceprint information. The electronic apparatus is controlled to run the second application other than the first application if the first voiceprint information matches the preset voiceprint information.

Thus, according to this embodiment, the different applications or the different threads of the same process on the electronic apparatus can be controlled by extracting the different characteristics of the voice information.

In this embodiment, there may be more than one preset voiceprint information. For a private electronic apparatus, the preset voiceprint information can be the user's own voiceprint information. For a public electronic apparatus, such as a public computer of a company, there may be more than one preset voiceprint information.

In particular, in matching the voiceprint information, the first voiceprint information is compared with the preset voiceprint information to obtain a match value. The obtained first voiceprint information is the preset voiceprint information if the match value is larger than a preset match threshold. For example, the first voiceprint information is the preset voiceprint information if the match value is 89% and the preset match threshold is 80%.

In this embodiment, in order to improve the accuracy and reliability of the obtained first content information and first voiceprint information, step S20 may further comprise:

S201: obtaining a first reliability degree of the first content information and a second reliability degree of the first voiceprint information, wherein the first reliability degree corresponds to reliability of the first content information and the second reliability degree corresponds to reliability of the first voiceprint information;

S202: selecting a first reliability degree threshold from at least two preset reliability degree thresholds;

S203: determining whether the first reliability degree is larger than the first reliability degree threshold to obtain a first determination result and/or determining whether the second reliability degree is larger than the first reliability degree threshold to obtain a second determination result; and S204: setting the first content information as a final content information if the first determination result is YES and setting the first voiceprint information as a final voiceprint information if the second determination result is YES, wherein the first determination result being YES indicates that the first content information is accurate and the second determination result being YES indicates that the first voiceprint information is accurate.

In particular, in order to ensure reliability of the voice information, in S201, the electronic apparatus may perform voice recognition on the voice information using any voice recognition technology that already exists or might become possible in the future to obtain a recognition result. The recognition result comprises the first content information and the first reliability degree of the first content information and the first voiceprint information and the second reliability degree of the first voiceprint information. The first reliability degree corresponds to the reliability of the first content information and the second reliability degree corresponds to the reliability of the first voiceprint information. Taking the voice recognition using pattern matching as an example, the user utters each word in a vocabulary in sequence for one time and characteristic vectors thereof are stored in a template library as templates during a training phase. Then, a characteristic vector is extracted from the original voice, i.e., the voice information and compared with each template in the template library. The template having the highest similarity, i.e., the reliability degree, is output as the recognition result.

In practice, accurate voice recognition is difficult because, e.g., voice pattern may vary for different people or even for a same person. For example, the voice information may be different when a person is speaking seriously and when he/she is speaking casually. The voice is obscure in its nature and the accent, tone, volume, and speed thereof may be affected by its context. The voice recognition may also be affected severely by environmental noise and interference. Therefore, for a same voice input, the reliability degree may be very different for the recognition results under different environments or backgrounds.

In case where a single reliability degree threshold is set for determining whether the recognition content is accurate, possibility of failing to obtain the recognition result, i.e., recognition failure, may be high if the reliability degree threshold is set too high. On the other hand, the recognition result may be less accurate if the reliability degree threshold is set too low. For example, if the voice input contains more than one language, e.g., "打开 filefox," the reliability degree in the recognition result is generally low. In such a case, the recognition may fail if a common reliability degree threshold is used.

Therefore, in order to ensure the reliability as well as success rate of the voice recognition of the electronic apparatus, step S202 is performed to select one first reliability degree threshold from at least two preset reliability degree thresholds.

In particular, in step S202, at least two different reliability degree thresholds are preset. The different reliability degree thresholds can be selected for use in different circumstances. The at least two reliability degree thresholds are preset according to at least one of: contents identifiable by the electronic apparatus and a network condition of the electronic apparatus.

Also, in practice, the reliability degree threshold may be selected from the at least two reliability degree thresholds according to a current scene of the first voice recognition device. For example, the reliability degree threshold may be selected according to the recognition content corresponding to the voice input and network connectivity of the first voice recognition device. The principle of selection can be adjusted as desired.

Specifically, the reliability degree thresholds for the first content information and the first voiceprint information may be identical or different. The reliability degree thresholds can be set as desired.

In an embodiment of the present disclosure, in S203, the reliability of the recognition result comprising the first content information and the first voiceprint information is determined using the first reliability degree and the second reliability degree obtained in step S201 and the reliability degree threshold obtained in step S202. It is determined whether the first reliability degree is larger than the first reliability degree threshold to obtain the first determination result. It is also determined whether the second reliability degree is larger than the first reliability degree threshold to obtain the second determination result.

After step S203, step S204 is performed to set the first content information as a final content information if the first determination result is YES and to set the first voiceprint information as a final voiceprint information if the second determination result is YES In an embodiment of the present disclosure, the electronic apparatus may be connected to a second voice recognition device via a network, which can enable more accurate voice recognition using network resources and share its voice recognition result with the electronic apparatus. The second voice recognition device may be a separate voice recognition device or be integrated into another electronic apparatus, such as a network server or a notebook computer. The electronic apparatus may transmit the received audio signal to the second voice recognition device and receives recognized content therefrom. In an embodiment of the present disclosure, the recognized content may comprise the first content information and the first voiceprint information.

Furthermore, in an embodiment of the present disclosure, if the first determination result and/or the second determination result are NO, i.e., when the recognition result is determined to be inaccurate in S203, the audio signal is transmitted to the second voice recognition device connected with the electronic apparatus. However, the present disclosure is not limited thereto. The audio signal may also be transmitted to the second voice recognition device connected with the electronic apparatus via the network immediately after the audio signal is obtained in S10. In this way, the second content information and/or the second voiceprint information can be received from the second voice recognition device as soon as possible when the first reliability degree and/or the second reliability degree are less than the preset first reliability degree threshold.

The second content information or the second voiceprint information may not be received if the network is blocked or interrupted when the electronic apparatus is awaiting receiving the second content information or the second voiceprint information from the second voice recognition device. User experience may degrade significantly if the waiting time is too long. Thus, a predetermined time period may be set so that the electronic apparatus no long waits to receive the second content information or the second voiceprint information if it cannot receive the same within the predetermined time period.

Thus, the embodiment of the present disclosure can ensure the reliability of the obtained first content information and the first voiceprint information.

In an embodiment of the present disclosure, after the first content information and the first voiceprint information are obtained in step S20, step S30 is performed to control the electronic apparatus to run the first application corresponding to the first content information and control the electronic apparatus to run the second application other than the first application if the first voiceprint information is the preset voiceprint information.

In practice, the first and second applications may be two different applications or different threads under a same process. The first and second applications may be set as desired.

In an embodiment of the present disclosure, the first and second applications may be two different applications. The first application may correspond to a software "Taobao" and the second application may correspond to a password management software for recording and managing a plurality of authentication information of the user such as username and password, etc. When the first content information detected by the electronic apparatus is "Launch Taobao," the electronic apparatus runs the first application corresponding to "Taobao." When the first voiceprint information detected by electronic apparatus from the user's voice is the preset voiceprint information, the electronic apparatus runs the second application corresponding to the preset voiceprint information to launch the password management software.

Furthermore, the electronic apparatus may perform authentication operation using authentication information corresponding to "Taobao," which is managed by the password management software.

In particular, first, the electronic apparatus obtains the authentication information corresponding to "Taobao" managed by the password management software. In practice, the authentication information may be store locally, i.e., in a memory of the electronic apparatus, or in a second electronic apparatus connected with the electronic apparatus. Alternatively, the authentication information may be obtained from network. The manner of storing or obtaining the authentication information does not constitute a limitation to the present disclosure.

Next, the electronic apparatus fills out the login page of the application or any authentication-required page, e.g., payment page, using the obtain authentication information. For example, the obtain authentication information comprises a username "ZHANG San" and a password "admin123." The electronic apparatus then fill out the login page with "ZHANG San" in a dialog box for the username and "admin123" in a dialog box for the password.

In an embodiment of the present disclosure, the user can be further authenticated by a dynamic password after the electronic apparatus launched the password management software in order to provide enhanced security to the authentication information of the user. Only the user passing the authentication can obtain the authentication information of the corresponding application.

In particular, a dynamic password is generated and displayed on a display screen of the electronic apparatus after the password management software is launched. The user is prompted to read the dynamic password display on the screen. In particular, the dynamic password may be but not limited to any one of numerals, English letters, or English letter plus numerals. For example, if the numeral dynamic password contains three bits, there may be about 1000 possible dynamic passwords.

In an embodiment of the present disclosure, for example, the generated dynamic password may be "ab4633." First, the electronic apparatus detects the voice information produced when the user is reading the dynamic password. The electronic apparatus then performs voice recognition on the voice information to obtain the third content information and the third voiceprint information. The process of obtaining these information is omitted for conciseness.

Furthermore, the electronic apparatus can obtain the authentication information managed by the password management software only if the third content information matches the dynamic password "ab4633" and the third voiceprint information matches the preset voiceprint voiceprint information.

Embodiment 33

This embodiment provides an electronic apparatus, comprising:

a first obtaining unit 30 configured for detecting a voice information;

a second obtain unit 31 configured for obtaining a first content information and a first voiceprint information from the voice information; and a first processing unit 32 configured for controlling the electronic apparatus to run a first application corresponding to the first content information and controlling the electronic apparatus to run a second application other than the first application if the first voiceprint information is a preset voiceprint information.

Optionally, in order to ensure accuracy of the first content information and the first voiceprint information, the second obtaining unit 31 may comprise:

a second obtain sub-unit configured for obtaining a first reliability degree of the first content information and a second reliability degree of the first voiceprint information, wherein the first reliability degree corresponds to reliability of the first content information and the second reliability degree corresponds to reliability of the first voiceprint information;

a second selecting sub-unit configured for selecting a first reliability degree threshold from at least two preset reliability degree thresholds;

a second determination sub-unit configured for determining whether the first reliability degree is larger than the first reliability degree threshold to obtain a first determination result and/or determining whether the second reliability degree is larger than the first reliability degree threshold to obtain a second determination result; and a second processing sub-unit configured for setting the first content information as a final content information if the first determination result is YES and setting the first voiceprint information as a final voiceprint information if the second determination result is YES, wherein the first determination result being YES indicates that the first content information is accurate and the second determination result being YES indicates that the first voiceprint information is accurate.

Optionally, the at least two reliability degree thresholds may be preset according to at least one of: contents identifiable by the second obtaining unit of the electronic apparatus and a network condition of the electronic apparatus.

Optionally, the second processing sub-unit may be further configured for, after the obtaining the first determination result and/or the second determination result:

transmitting the voice information to a second voice recognition device connected with the electronic apparatus if the first determination result and/or the second determination result is NO, the second voice recognition device being configured for identifying the voice information to obtain a second content information if the first determination result is NO and to obtain a second voiceprint information if the second determination result is NO; and receiving the obtained second content information and/or second voiceprint information from the second voice recognition device and setting the obtained second content information and/or second voiceprint information as the final content information or the final voiceprint information, respectively.

Optionally, the second processing sub-unit may be further configured for, after the detecting the voice information:

transmitting the voice information to a second voice recognition device connected with the electronic apparatus, the second voice recognition device being configured for identifying the voice information to obtain a second content information and/or a second voiceprint information; and receiving the second content information from the second voice recognition device if the first determination result is NO and receiving the second voiceprint information from the second voice recognition device if the second determination result is NO within a preset time period, if the first determination result and/or the second determination result are NO.

Optionally, in order to facilitate login and use of the application installed on the electronic apparatus, the electronic apparatus may further comprise a second processing unit configured for: after the controlling the electronic apparatus to run the first application corresponding to the first content information and controlling the electronic apparatus to run the second application other than the first application if the first voiceprint information is the preset voiceprint information:

obtaining a first authentication information corresponding to the first application by running the second application, the first authentication information being stored in the electronic apparatus and used for authentication of the first application.

Optionally, in order to secure the password of the user, the second processing sub-unit may comprise:

a first generating sub-unit configured for generating a dynamic password through running the second application by the electronic apparatus;

a third obtaining sub-unit configured for detecting a second voice information produced when a user is reading the dynamic password;

a third determining sub-unit configured for determining whether the second voice information satisfies a preset condition to obtain a third determination result; and a third processing sub-unit configured for obtaining the first authentication information if the third determination result is YES.

Optionally, the third determining sub-unit may comprise:

a third obtaining module configured for obtaining a third content information and a third voiceprint information from the second voice information;

a third determining module configured for determining whether the third content information is the dynamic password to obtain a fourth determination result;

a third processing module configured for:

determining whether the third voice information is the preset voiceprint information if the fourth determination result is YES; and determining the third determination result to be YES if the fourth determination result is YES and the third voiceprint information is the preset voiceprint information and otherwise determining the third determination result to be NO.

The electronic apparatus of this embodiment may operate according to the above-described method. Therefore, a detailed description thereof is omitted.

One or more embodiments of the present disclosure may have the following advantages:

1. According to the foregoing method, the voice information is detected and the first content information and the first voiceprint information are obtained therefrom. Then the electronic apparatus is controlled to run the first application corresponding to the first content information and to run the second application other than the first application if the first voiceprint information is the preset voiceprint information. In an embodiment of the present disclosure, two applications can be controlled by different characteristics of one single voice information. Thus, the embodiment provides an efficient way for controlling the application on the electronic apparatus by voice.

2. A plurality of reliability degree thresholds are preset and the reliability degree threshold for determining the accuracy of the recognition content is selected therefrom. The electronic apparatus can thus use the reliability degree threshold to determine the recognition content in a flexible way so as to ensure success rate and reliability of the voice recognition.

3. The first authentication information corresponding to the first application can be obtained by running the second application. The electronic apparatus may then perform authentication for the first application based on the first authentication information, thereby facilitating use of the authentication-required application installed on the electronic apparatus. The authentication information, e.g., the username and the password, can be obtained simultaneously with the launch of the corresponding application by one single voice command. The application then can be logged in automatically, thereby facilitating login and use of the application installed on the electronic apparatus and improving user experience.

4. The dynamic password is generated after the electronic apparatus runs the second application. The user's authentication information is obtained only if both the content and voiceprint produced when the user is reading the dynamic password satisfy preset conditions. This provides enhanced security to the user's password.

It should be noted that the embodiment of the present disclosure may be implemented as method, system, or computer program product. Thus, the present disclosure can be implemented in pure hardware, pure software, or combination of hardware and software. Also, the present disclosure may be implemented in a computer program product embodied on one or more computer-readable storage medium, including but not limited to disk memory, CD-ROM, or optical memory, etc., containing computer-executable program codes.

The present disclosure has be described with reference to flow chart and/or block diagram of the methods, apparatus (or system), or computer program products. It should be noted that each flow and/or block in the flow chart and/or block diagram and any combination of the flow and/or block in the flow chart and/or block diagram can be implemented by computer program instructions. These computer program instructions can be provided to a general computer, a specialized computer, an embedded processing machine, or a processor of other programmable data processing apparatus to generate a machine so that a device for performing specific functions in one or more flows in the flow charts and/or one or more blocks in the block diagrams can be generated by executing the instructions by the computer or the processor of the other programmable data processing apparatus.

These computer program instructions may be stored in a computer-readable memory capable of directing the computer or another programmable data processing device to operate in a specific manner. The instructions stored in the computer-readable memory may generate a product comprising instruction means for implementing one or more flows in the flow charts and/or the functions in one or more blocks in the block diagrams.

Specifically, the computer program instructions corresponding to the information processing method of the embodiments of the present disclosure may be stored in a storage medium such as an optical disk, a hard disk, or a U disk, etc. The computer program instructions corresponding to the information processing method, when are read or executed by an electronic apparatus, cause the electronic apparatus to perform:

detecting a voice information;

obtaining a first content information and a first voiceprint information from the voice information;

controlling the electronic apparatus to run a first application corresponding to the first content information; and controlling the electronic apparatus to run a second application other than the first application if the first voiceprint information is a preset voiceprint information.

Optionally, the computer program instructions corresponding to the obtaining the first content information and the first voiceprint information from the voice information, when being executed, may cause the electronic apparatus to perform:

obtaining a first reliability degree of the first content information and a second reliability degree of the first voiceprint information, wherein the first reliability degree corresponds to reliability of the first content information and the second reliability degree corresponds to reliability of the first voiceprint information;

selecting a first reliability degree threshold from at least two preset reliability degree thresholds;

determining whether the first reliability degree is larger than the first reliability degree threshold to obtain a first determination result and/or determining whether the second reliability degree is larger than the first reliability degree threshold to obtain a second determination result; and setting the first content information as a final content information if the first determination result is YES and setting the first voiceprint information as a final voiceprint information if the second determination result is YES, wherein the first determination result being YES indicates that the first content information is accurate and the second determination result being YES indicates that the first voiceprint information is accurate.

Optionally, the at least two reliability degree thresholds are preset according to at least one of: contents identifiable by a second obtaining unit of the electronic apparatus and a network condition of the electronic apparatus.

Optionally, the computer program instructions corresponding to the obtaining the first and/or second determination results, when being executed, may cause the electronic apparatus to perform:

transmitting the voice information to a second voice recognition device connected with the electronic apparatus if the first determination result and/or the second determination result is NO, the second voice recognition device being configured for identifying the voice information to obtain a second content information if the first determination result is NO and to obtain a second voiceprint information if the second determination result is NO; and receiving the obtained second content information and/or second voiceprint information from the second voice recognition device and setting the obtained second content information and/or second voiceprint information as the final content information or voiceprint information, respectively.

Optionally, the storage medium may store some further instructions, which, when being executed after the instructions corresponding to the detecting the voice information are executed, may cause the electronic apparatus to perform:

transmitting the voice information to a second voice recognition device connected with the electronic apparatus, the second voice recognition device being configured for identifying the voice information to obtain a second content information and/or a second voiceprint information; and receiving the second content information from the second voice recognition device if the first determination result is NO and receiving the second voiceprint information from the second voice recognition device if the second determination result is NO within a preset time period, if the first determination result and/or the second determination result are NO.

Optionally, the storage medium may store some further instructions, which, when being executed, after the instructions corresponding to controlling the electronic apparatus to run the first application corresponding to the first content information and controlling the electronic apparatus to run the second application other than the first application if the first voiceprint information is the preset voiceprint information are executed, may cause the electronic apparatus to perform:

obtaining a first authentication information corresponding to the first application by running the second application, the first authentication information being stored in the electronic apparatus and used for authentication of the first application.

Optionally, the computer program instructions corresponding to the obtaining the first authentication information corresponding to the first application by running the second application, when being executed, may cause the electronic apparatus to perform:

generating a dynamic password through running the second application by the electronic apparatus;

detecting a second voice information produced when a user is reading the dynamic password;

determining whether the second voice information satisfies a preset condition to obtain a third determination result; and obtaining the first authentication information if the third determination result is YES.

Optionally, the computer program instructions corresponding to the determining whether the second voice information satisfies the preset condition to obtain the third determination result may comprise, when being executed, may cause the electronic apparatus to perform:

obtaining a third content information and a third voiceprint information from the second voice information;

determining whether the third content information is the dynamic password to obtain a fourth determination result;

determining whether the third voice information is the preset voiceprint information if the fourth determination result is YES; and determining the third determination result to be YES if the fourth determination result is YES and the third voiceprint information is the preset voiceprint information and otherwise determining the third determination result to be NO.

Embodiments of the present disclosure have been described as above. However, the above description is only illustrative rather than constituting any limitation thereof. Those skilled in the art may make any modification or variation to the specific manner and details of implementation of the disclosure without departing from the spirit and scope thereof. The scope of the present disclosure is defined by the attached claims.

We claim:

1. A voice recognition method for use in an electronic apparatus comprising a voice input module, the method comprising:
    receiving voice data by the voice input module;
    performing a first pattern voice recognition on the received voice data, including identifying whether the voice data comprises a first voice recognition information;
    performing a second pattern voice recognition on the voice data if the first pattern voice recognition identifies that the voice data comprises the first voice recognition information;
    performing a third pattern voice recognition on a second voice recognition information other than the first voice recognition information if the voice data comprises the second voice recognition information, in case where the result of the second pattern voice recognition is SUCCESS; and
    performing or refusing the operation corresponding to the first voice recognition information and an operation corresponding to the second voice recognition information according to a result of the third pattern voice recognition;
    wherein the third pattern voice recognition comprises preset-command-unrelated voiceprint authentication; and training a model to be used in the preset-command-unrelated voiceprint authentication using voice data of a specific scene to optimize the model.

2. The method according to claim 1, wherein:
    the second pattern voice recognition comprises preset-command-related voiceprint authentication.

3. The method according to claim 1, wherein:
    performing or refusing the operation corresponding to the first voice recognition information and the operation corresponding to the second voice recognition information according to the result of the third pattern voice recognition comprises:
    performing the operation corresponding to the first voice recognition information and the operation corresponding to the second voice recognition information if a result of the preset-command-unrelated voiceprint authentication is SUCCESS; and
    refusing the operation corresponding to the first voice recognition information and the operation corresponding to the second voice recognition information if the result of the preset-command-unrelated voiceprint authentication is FAILURE.

4. The method according to claim 1, further comprising:
setting or modifying, according to a first instruction, a set of the first voice recognition information or a correspondence between the first voice recognition information and the operation corresponding to the first voice recognition information.

\* \* \* \* \*